United States Patent
Wu et al.

(10) Patent No.: US 11,570,726 B2
(45) Date of Patent: Jan. 31, 2023

(54) SIDELINK POWER CONTROL METHOD AND TERMINAL FOR PERFORMING SIDELINK POWER CONTROL

(71) Applicant: Samsung Electronics Co., Ltd., Suwon-si (KR)

(72) Inventors: Min Wu, Beijing (CN); Feifei Sun, Beijing (CN); Miao Zhou, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 202 days.

(21) Appl. No.: 16/833,077

(22) Filed: Mar. 27, 2020

(65) Prior Publication Data
US 2020/0314770 A1 Oct. 1, 2020

(30) Foreign Application Priority Data
Mar. 28, 2019 (CN) .......................... 201910244836.9

(51) Int. Cl.
*H04W 52/36* (2009.01)
*H04W 52/24* (2009.01)
(Continued)

(52) U.S. Cl.
CPC ......... *H04W 52/367* (2013.01); *H04L 5/0051* (2013.01); *H04L 5/10* (2013.01); *H04W 52/242* (2013.01); *H04W 92/18* (2013.01)

(58) Field of Classification Search
CPC . H04W 52/367; H04W 52/242; H04W 92/18; H04W 52/325; H04W 52/281;
(Continued)

(56) References Cited

U.S. PATENT DOCUMENTS

2016/0204885 A1 7/2016 Sorrentino et al.
2019/0028974 A1 1/2019 Wang et al.
(Continued)

OTHER PUBLICATIONS

Huawei, 3GPP TSG RAN WG1 Meeting #96 R1-1903074, "Power control and power sharing for V2X sidelink", Feb. 25-Mar. 1, 2019 (Year: 2019).*
(Continued)

*Primary Examiner* — Justin T Van Roie

(57) ABSTRACT

The present disclosure relates to a pre-5th-Generation (5G) or 5G communication system to be provided for supporting higher data rates Beyond 4th-Generation (4G) communication system such as Long Term Evolution (LTE). A power control method, and a terminal for performing power control. The power control method includes: acquiring parameter configuration information for sidelink open loop power control; transmitting a sidelink physical channel or a sidelink physical signal to a second UE, so that the second UE measures a Reference Signal Received Power (RSRP) based on the received sidelink physical channel or the sidelink physical signal, and feeds back the measured RSRP to a first UE; receiving the RSRP fed back by the second UE; calculating an open loop transmitting power based on the received RSRP and the acquired parameter configuration information for sidelink open loop power control.

8 Claims, 14 Drawing Sheets

(51) Int. Cl.
*H04L 5/00* (2006.01)
*H04L 5/10* (2006.01)
*H04W 92/18* (2009.01)

(58) Field of Classification Search
CPC . H04W 52/383; H04W 52/10; H04W 52/245; H04W 52/247; H04W 52/34; H04L 5/0051; H04L 5/10; H04B 17/327
See application file for complete search history.

(56) References Cited

U.S. PATENT DOCUMENTS

2021/0022084 A1* 1/2021 Jiang ..................... H04L 1/0026
2021/0410084 A1* 12/2021 Li ....................... H04W 52/265

OTHER PUBLICATIONS

LG Electronics, 3GPP TSG RAN WG1 #96 R1-1903367, "Feature lead summary for agenda item 7.2.4.1.2 Physical layer procedures", Feb. 25-Mar. 1, 2019 (Year: 2019).*
Abdallah et al., IEEE, "PowerControl and Channel Allocation for D2D Underlaid Cellular Networks", Mar. 2, 2018 (Year: 2018).*
Samsung, "On Sidelink Power Control," R1-1906950, 3GPP TSG RAN WG1 #9 7, Reno, USA, May 13-17, 2019, 8 pages.
Samsung, "On Physical Layer Procedures for NR V2X," R1-1908481, 3GPP TSG RAN WG1 #98, Prague, CZ, Aug. 26-30, 2019, 20 pages.
3GPP TS 38.211 V16.0.0 (Dec. 2019), Technical Specification, 3rd Generation Partnership Project; Technical Specification Group Radio Access Network; NR; Physical channels and modulation (Release 16), Dec. 2019, 129 pages.
3GPP TS 38.213 V16.0.0 (Dec. 2019), Technical Specification, 3rd Generation Partnership Project; Technical Specification Group Radio Access Network; NR; Physical layer procedures for control (Release 16), Dec. 2019, 146 pages.
3GPP TS 38.214 V16.0.0 (Dec. 2019), Technical Specification, 3rd Generation Partnership Project; Technical Specification Group Radio Access Network; NR; Physical layer procedures for data (Release 16), Dec. 2019, 147 pages.
Samsung, "Considerations on Sidelink Power Control", 3GPP TSG RAN WG1 #96, Feb. 25-Mar. 1, 2019, R1-1902286, 7 pages.
Samsung, "On Physical Layer Procedures for NR V2X", 3GPP TSG RAN WG1 #96, Feb. 25-Mar. 1, 2019, R1-1902274, 13 pages.
Huawei, HiSilicon, "Sidelink physical layer procedures for NR V2X", 3GPP TSG RAN WG1 Ad-Hoc Meeting 1901, Jan. 21-25, 2019, R1-1900023, 13 pages.
International Search Report dated Jul. 8, 2020 in connection with International Patent Application No. PCT/KR2020/004131, 3 pages.
Written Opinion of the International Searching Authority dated Jul. 8, 2020 in connection with International Patent Application No. PCT/KR2020/004131, 8 pages.

* cited by examiner

SIDELINK POWER CONTROL METHOD AND TERMINAL FOR PERFORMING SIDELINK POWER CONTROL

CROSS-REFERENCE TO RELATED APPLICATION

This application is based on and claims priority under 35 U.S.C. § 119 to Chinese Patent Application No. 201910244836.9, filed on Mar. 28, 2019, the disclosure of which is incorporated by reference herein in its entirety.

BACKGROUND

1. Field

The present disclosure relates to a field of communication technique, and more particularly, to a power control method and a terminal for performing power control.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 3GPP LTE standard, a direct communication link between User Equipments (UEs) is referred to as sidelink (SL). Similar to a downlink (DL) and an uplink (UL), a sidelink includes a control channel and a data channel, among which the former is referred to as Physical Sidelink Control Channel (PSCCH), and the latter is referred to as Physical Sidelink Shared Channel (PSSCH). The PSCCH is used to indicate information regarding a time-frequency domain resource location, a modulation and coding mode and the like of PSSCH transmission, and the PSSCH is used to carry data.

Two types of sidelink communication mechanisms are defined in the 3GPP LTE standard, namely, Device to Device (D2D) and Vehicle to Vehicle/Pedestrian/Infrastructure/Network (Hereinafter referred to as V2X) based on the sidelink. The V2X has better performance than the D2D in terms of data rate, time delay and reliability, so the V2X has become a most representative sidelink communication technology in the current 3GPP LTE standard.

From the perspective of resource allocation mechanism, an existing LTE V2X technology includes two modes, namely, a resource allocation mode based on base station scheduling (Mode 3) and a resource allocation mode in which the UE makes selection autonomously (Mode 4). For Mode 3, the UE determines the transmitting resources on the sidelink channel allocated by the base station by receiving the downlink control channel of the base station, and the mutual interference between the transmission resources of different UEs may be minimized by an appropriate base station scheduling policy. For Mode 4, the base station does not participate in resource allocation, and the UE determines the optimal transmitting resource by detecting the channel. Since the existing LTE V2X technology is mainly used to support the broadcast service at the beginning of the design, a broadcast transmission mode is used in Mode 3 and Mode 4 at the physical layer, that is, the physical channel transmitted by the UE is received and decoded by all UEs within a certain range. In addition, for UEs in coverage (IC) of a cellular network, both the transmission of Mode 3 and the transmission of Mode 4 support an open loop power control, and an open loop transmitting power is calculated based on a downlink pathloss between the UE and the base station of the cell in which the UE is located.

In a 3GPP 5G New Radio (NR) system, V2X is one of the Rel-16 NR standard Work Items (WI). In the NR V2X system, in order to support more data service types, sidelink communication supports the groupcast service (that is, the physical channel transmitted by the UE is received and decoded by a group of UEs within a certain range) and the unicast service (that is, the physical channel transmitted by the UE is received and decoded by another UE within a certain range), as well as the broadcast service. In order to improve the interference between UEs in the sidelink system, both the groupcast service and the unicast service may support the calculation of the open loop transmitting power based on the pathloss between the two UEs, but the relevant technical details are still not clear, the present application mainly proposes solutions for relevant technical details.

SUMMARY

According to the exemplary embodiment of the present disclosure, there is provided a power control method, which is performed by a first UE. The power control method includes: acquiring parameter configuration information for sidelink open loop power control; transmitting a sidelink physical channel and/or a sidelink physical signal to a second UE, so that the second UE measures a Reference Signal Received Power (RSRP) based on the received sidelink physical channel and/or the sidelink physical signal, and feeds back the measured RSRP to the first UE; receiving the RSRP fed back by the second UE; calculating an open loop transmitting power based on the received RSRP and the acquired parameter configuration information for sidelink open loop power control.

Alternatively, the power control method may further include transmitting a Physical Sidelink Control Channel (PSCCH), a Physical Sidelink Shared Channel (PSSCH), and/or a Physical Sidelink Feedback Channel (PSFCH) to the second UE, based on the calculated open loop transmitting power.

Alternatively, the sidelink physical channel includes at least one of the PSCCH, PSSCH, and the PSFCH, wherein the PSCCH, the PSSCH, and the PSFCH share the same parameter configuration information for sidelink open loop power control, or, the PSCCH and the PSSCH share the same parameter configuration information for sidelink open loop power control, and the PSFCH is configured with parameter configuration information for sidelink open loop power control separately from the PSCCH and the PSSCH, or, the PSCCH, the PSSCH, and the PSFCH are configured with parameter configuration information for sidelink open loop power control separately from each other, or, the PSCCH and the PSFCH share the same parameter configuration information for sidelink open loop power control, and the PSSCH is configured with parameter configuration information for sidelink open loop power control separately from the PSCCH and the PSFCH.

Alternatively, acquiring parameter configuration information for sidelink open loop power control may include receiving the parameter configuration information for sidelink open loop power control configured by a UE-specific Radio Resource Control (RRC) signaling transmitted by a base station, through a Uu interface between the first UE and the base station, and/or, acquiring the parameter configuration information for sidelink open loop power control from the sidelink pre-configuration parameters of the first UE.

Alternatively, the parameter configuration information for sidelink open loop power control is associated with a configuration of a resource pool, the acquired parameter configuration information for sidelink open loop power control is parameter configuration information for sidelink open loop power control corresponding to the resource pool, and/or, the parameter configuration information for sidelink open loop power control is associated with a channel busy ratio on the resource pool, the acquired parameter configuration information for sidelink open loop power control is parameter configuration information for sidelink open loop power control corresponding to the channel busy ratio measured by the first UE on the resource pool, and/or, the first UE determines whether to perform power control according to the channel busy ratio measured on the resource pool of the first UE, even if the resource pool of the first UE is configured with the parameter configuration information for sidelink open loop power control.

Alternatively, receiving the RSRP fed back by the second UE may include receiving the RSRP fed back by the second UE through a PC5 interface, or, receiving the RSRP fed back by the second UE through a Uu interface, wherein receiving the RSRP fed back by the second UE through a PC5 interface may include receiving the RSRP fed back by the second UE through the PSFCH, wherein the sidelink control information of the PSFCH includes at least one of an ID of the first UE and an ID of the second UE, or, receiving the RSRP fed back by the second UE through a unicast PSSCH and/or a broadcast PSSCH.

Alternatively, the sidelink physical channel and/or the sidelink physical signal, which is used for measuring RSRP by the second UE, is a broadcast service transmitted by the first UE, or, the sidelink physical channel and/or the sidelink physical signal, which is used for measuring RSRP by the second UE, is a groupcast service transmitted by the first UE, or, the sidelink physical channel and/or the sidelink physical signal, which is used for measuring RSRP by the second UE, is a broadcast service and a groupcast service transmitted by the first UE, wherein the broadcast service and the groupcast service use the same transmitting power, or, the sidelink physical channel and/or the sidelink physical signal, which is used for measuring RSRP by the second UE, is a broadcast service, a groupcast service and/or a unicast service transmitted by the first UE, wherein a transmitting power of demodulation reference signal DMRS of the broadcast service, the groupcast service and/or the unicast service are the same.

Alternatively, when the power control method is used in groupcast service, receiving the RSRP fed back by the second UE may include receiving the RSRP fed back by all second UEs, or, receiving the RSRP fed back by second UEs meeting a pre-defined or pre-configured condition, and, calculating an open loop transmitting power based on the received RSRP and the acquired parameter configuration information for sidelink open loop power control may include calculating the open loop transmitting power based on a minimum value of all received RSRPs and the acquired parameter configuration information for sidelink open loop power control.

Alternatively, when the RSRP fed back by the second UE is an L3-RSRP which is generated after performing layer 3 filtering on an L1-RSRP and fed back via a high layer signaling, calculating an open loop transmitting power based on the received RSRP and the acquired parameter configuration information for sidelink open loop power control may include calculating the open loop transmitting power based on the L3-RSRP and the acquired parameter configuration information for sidelink open loop power control. Or, when the RSRP fed back by the second UE is an L1-RSRP fed back via a physical layer signaling, calculating an open loop transmitting power based on the received RSRP and the acquired parameter configuration information for sidelink open loop power control may include generating an L3-RSRP based on the fed back L1-RSRP, calculating the open loop transmitting power based on the L3-RSRP and the acquired parameter configuration information for sidelink open loop power control. Or, when the RSRP fed back by the second UE is an L1-RSRP fed back via a physical layer signaling, calculating an open loop transmitting power based on the received RSRP and the acquired parameter configuration information for sidelink open loop power control may include calculating the open loop transmitting power based on the fed back L1-RSRP and the acquired parameter configuration information for sidelink open loop power control.

Alternatively, calculating an open loop transmitting power based on the received RSRP and the acquired parameter configuration information for sidelink open loop power control may include: calculating an sidelink pathloss between the first UE and the second UE based on the received RSRP; calculating the open loop transmitting power based on the calculated sidelink pathloss and the acquired parameter configuration information for sidelink open loop power control.

Alternatively, the power control method may further include transmitting the PSCCH, the PSSCH, and/or the PSFCH to the second UE based on a minimum one of the calculated open loop transmitting power and the open loop transmitting power of the downlink pathloss, or, transmitting the PSCCH, the PSSCH, and/or the PSFCH to the second UE based on a maximum one of the calculated open loop transmitting power and the open loop transmitting power of the downlink pathloss, or, transmitting the PSCCH, the PSSCH, and/or the PSFCH to the second UE based on one having a higher priority of the calculated open loop transmitting power and the open loop transmitting power of the downlink pathloss, or, transmitting the PSCCH, the PSSCH, and/or the PSFCH to the second UE based on a weighted value of the calculated open loop transmitting power and the open loop transmitting power of the downlink pathloss, or, transmitting the PSCCH, the PSSCH, and/or the PSFCH to the second UE based on the open loop transmitting power of the downlink pathloss, when the calculated open loop transmitting power is inconsistent with an open loop transmitting power of a downlink pathloss configured in the open loop power control based on the downlink pathloss.

Alternatively, the power control method may further include transmitting the PSCCH, the PSSCH, and/or the PSFCH to the second UE by using a pre-configured power, before the RSRP feedback of the second UE is obtained, or, transmitting the PSCCH, the PSSCH, and/or the PSFCH to the second UE by using a rated maximum transmitting power, before the RSRP feedback of the second UE is obtained, or, transmitting the PSCCH, the PSSCH, and/or the PSFCH to the second UE by using a pre-configured maximum transmitting power, before the RSRP feedback of the second UE is obtained, or, transmitting the PSCCH, the PSSCH, and/or the PSFCH to the second UE by using a power determined based on the open loop power control for the downlink pathloss, before the RSRP feedback of the second UE is obtained.

According to the exemplary embodiment of the present disclosure, there is provided a power control method, which is performed by a second UE. The power control method includes receiving a sidelink physical channel and/or a sidelink physical signal transmitted by a first UE; measuring an RSRP based on the received sidelink physical channel and/or the sidelink physical signal; feeding back the measured RSRP to the first UE, so that the first UE determines an open loop transmitting power according to the fed back RSRP and the acquired parameter configuration information for sidelink open loop power control.

Alternatively, feeding back the measured RSRP to the first UE may include feeding back the measured RSRP to the first UE through a PC5 interface, or, feeding back the measured RSRP to the first UE through a Uu interface, wherein feeding back the measured RSRP to the first UE through a PC5 interface may include feeding back the measured RSRP to the first UE through a PSFCH, wherein the sidelink control information of the PSFCH includes at least one of an ID of the first UE and an ID of the second UE, or, feeding back the measured RSRP to the first UE through a unicast PSSCH and/or a broadcast PSSCH.

Alternatively, the sidelink physical channel and/or the sidelink physical signal, which is used for measuring RSRP by the second UE, is a broadcast service transmitted by the first UE, or, the sidelink physical channel and/or the sidelink physical signal, which is used for measuring RSRP by the second UE, is a groupcast service transmitted by the first UE, or, the sidelink physical channel and/or the sidelink physical signal, which is used for measuring RSRP by the second UE, is a broadcast service and a groupcast service transmitted by the first UE, wherein the broadcast service and the groupcast service use the same transmitting power, or, the sidelink physical channel and/or the sidelink physical signal, which is used for measuring RSRP by the second UE, is a broadcast service, a groupcast service and/or a unicast service transmitted by the first UE, wherein a transmitting power of demodulation reference signal DMRS of the broadcast service, the groupcast service and/or the unicast service are the same.

Alternatively, when the measured RSRP is an L1-RSRP, feeding back the measured RSRP to the first UE may include transferring the L1-RSRP to high layer and generating an L3-RSRP after performing layer 3 filtering, feeding back the generated L3-RSRP to the first UE through a high layer signaling, so that the first UE calculates the open loop transmitting power based on the L3-RSRP. Or, when the measured RSRP is an L1-RSRP, feeding back the measured RSRP to the first UE may include feeding back the L1-RSRP to the first UE through a physical layer signaling, so that the first UE generates an L3-RSRP according to the L1-RSRP and calculates the open loop transmitting power based on the L3-RSRP, and/or, so that the first UE calculates the open loop transmitting power based on the L1-RSRP.

Alternatively, the power control method may further include determining whether to measure and feed back the RSRP on the resource pool according to the parameter configuration information of the side open loop power control corresponding to the resource pool, or, triggering the second UE to measure and feed back the RSRP of the first UE via a dedicated signaling, wherein the dedicated signaling includes a dedicated signaling transmitted by the base station and/or a dedicated signaling transmitted by the first UE, or, triggering the second UE to measure and feed back the RSRP of the first UE in a manner in which the first UE broadcasts the PSSCH notification.

Alternatively, when the power control method is used in the groupcast service, feeding back the measured RSRP to the first UE may include feeding back the measured RSRP to the first UE in all conditions, or, feeding back the measured RSRP to the first UE when meeting a pre-defined or pre-configured condition, so that the first UE calculates the open loop transmitting power based on a minimum value of all received RSRPs and the acquired parameter configuration information for sidelink open loop power control.

According to the exemplary embodiment of the present disclosure, there is provided a terminal for performing power control including a configuration information acquiring module configured to acquire parameter configuration information for sidelink open loop power control, a signal transmitting module, configured to transmit a sidelink physical channel and/or a sidelink physical signal to a second UE so that the second UE measures an RSRP based on the received sidelink physical channel and/or the sidelink physical signal and feeds back the measured RSRP to the first UE, a feedback receiving module configured to receive the RSRP fed back by the second UE, and a power calculating module configured to calculate an open loop transmitting power based on the received RSRP and the acquired parameter configuration information for sidelink open loop power control.

Alternatively, the terminal for performing power control may further include a data transmitting module configured to transmit the PSCCH, the PSSCH, and/or the PSFCH to the second UE, based on the calculated open loop transmitting power.

Alternatively, the sidelink physical channel includes at least one of the PSCCH, the PSSCH, and the PSFCH, wherein the PSCCH, the PSSCH, and the PSFCH share the same parameter configuration information for sidelink open loop power control, or, the PSCCH and the PSSCH share the same parameter configuration information for sidelink open loop power control, and the PSFCH is configured with parameter configuration information for sidelink open loop power control separately from the PSCCH and the PSSCH, or, the PSCCH, the PSSCH, and the PSFCH are configured with parameter configuration information for sidelink open loop power control separately from each other, or, the PSCCH and the PSFCH share the same parameter configuration information for sidelink open loop power control, and the PSSCH is configured with parameter configuration information for sidelink open loop power control separately from the PSCCH and the PSFCH.

Alternatively, the configuration information acquiring module may be configured to receive the parameter configuration information for sidelink open loop power control configured by a UE-specific Radio Resource Control (RRC) signaling transmitted by a base station, through a Uu interface between the first UE and the base station, and/or, acquire the parameter configuration information for sidelink open loop power control from the sidelink pre-configuration parameters of the first UE.

Alternatively, the parameter configuration information for sidelink open loop power control is associated with a configuration of a resource pool, the acquired parameter configuration information for sidelink open loop power control is parameter configuration information for sidelink open loop power control corresponding to the resource pool, and/or, the parameter configuration information for sidelink open loop power control is associated with a channel busy ratio on the resource pool, the acquired parameter configuration information for sidelink open loop power control is parameter configuration information for sidelink open loop power control corresponding to the channel busy ratio measured by the first UE on the resource pool, and/or, the first UE determines whether to perform power control according to the channel busy ratio measured on the resource pool of the first UE, even if the resource pool of the first UE is configured with the parameter configuration information for sidelink open loop power control.

Alternatively, the feedback receiving module may be configured to receive the RSRP fed back by the second UE through a PC5 interface, or, receive the RSRP fed back by the second UE through a Uu interface, wherein the feedback receiving module may be further configured to receive the RSRP fed back by the second UE through the PSFCH, wherein the sidelink control information of the PSFCH includes at least one of an ID of the first UE and an ID of the second UE, or, to receive the RSRP fed back by the second UE through a unicast PSSCH and/or a broadcast PSSCH.

Alternatively, the sidelink physical channel and/or the sidelink physical signal, which is used for measuring RSRP by the second UE, is a broadcast service transmitted by the first UE, or, the sidelink physical channel and/or the sidelink physical signal, which is used for measuring RSRP by the second UE, is a groupcast service transmitted by the first UE, or, the sidelink physical channel and/or the sidelink physical signal, which is used for measuring RSRP by the second UE, is a broadcast service and a groupcast service transmitted by the first UE, wherein the broadcast service and the groupcast service use the same transmitting power, or, the sidelink physical channel and/or the sidelink physical signal, which is used for measuring RSRP by the second UE, is a broadcast service, a groupcast service and/or a unicast service transmitted by the first UE, wherein a transmitting power of demodulation reference signal DMRS of the broadcast service, the groupcast service and/or the unicast service are the same.

Alternatively, the feedback receiving module may be configured to receive the RSRP fed back by all second UEs, or, to receive the RSRP fed back by second UEs meeting a pre-defined or pre-configured condition, when the power control method is used in groupcast service, and, the power calculating module may be configured to calculate the open loop transmitting power based on a minimum value of all received RSRPs and the acquired parameter configuration information for sidelink open loop power control.

Alternatively, the power calculating module may be configured to calculate the open loop transmitting power based on the L3-RSRP and the acquired parameter configuration information for sidelink open loop power control, when the RSRP fed back by the second UE is an L3-RSRP generated after performing layer 3 filtering on an L1-RSRP and fed back via a high layer signaling, or, the power calculating module may be configured to generate an L3-RSRP based on the fed back L1-RSRP and calculate the open loop transmitting power based on the L3-RSRP and the acquired parameter configuration information for sidelink open loop power control, when the RSRP fed back by the second UE is an L1-RSRP fed back via a physical layer signaling, or, the power calculating module may be configured to calculate the open loop transmitting power based on the fed back L1-RSRP and the acquired parameter configuration information for sidelink open loop power control, when the RSRP fed back by the second UE is an L1-RSRP fed back via a physical layer signaling.

Alternatively, the power calculating module may be configured to calculate a sidelink pathloss between the first UE and the second UE based on the received RSRP, and calculate the open loop transmitting power based on the calculated sidelink pathloss and the acquired parameter configuration information for sidelink open loop power control.

Alternatively, the terminal for performing power control may further include a first transmitting module configured to transmit the PSCCH, the PSSCH, and/or the PSFCH to the second UE based on a minimum one of the calculated open loop transmitting power and the open loop transmitting power of the downlink pathloss, or, to transmit the PSCCH, the PSSCH, and/or the PSFCH to the second UE based on a maximum one of the calculated open loop transmitting power and the open loop transmitting power of the downlink pathloss, or, to transmit the PSCCH, the PSSCH, and/or the PSFCH to the second UE based on one of the calculated open loop transmitting power and the open loop transmitting power of the downlink pathloss, which has a higher priority or, to transmit the PSCCH, the PSSCH, and/or the PSFCH to the second UE based on a weighted value of the calculated open loop transmitting power and the open loop transmitting power of the downlink pathloss, or, to transmit the PSCCH, the PSSCH, and/or the PSFCH to the second UE based on the open loop transmitting power of the downlink pathloss, when the calculated open loop transmitting power is inconsistent with an open loop transmitting power of a downlink pathloss configured in the open loop power control based on the downlink pathloss.

Alternatively, the terminal for performing power control may further include a second transmitting module configured to transmit the PSCCH, the PSSCH, and/or the PSFCH to the second UE by using a pre-configured power, before the RSRP feedback of the second UE is obtained, or, to transmit the PSCCH, the PSSCH, and/or the PSFCH to the second UE by using a rated maximum transmitting power, before the RSRP feedback of the second UE is obtained, or, to transmit the PSCCH, the PSSCH, and/or the PSFCH to the second UE using a pre-configured maximum transmitting power, before the RSRP feedback of the second UE is obtained, or, to transmit the PSCCH, the PSSCH, and/or the PSFCH to the second UE using a power determined based on the open loop power control for downlink pathloss, before the RSRP feedback of the second UE is obtained.

According to the exemplary embodiment of the present disclosure, there is provided a terminal for performing power control including a signal receiving module configured to receive a sidelink physical channel and/or a sidelink physical signal transmitted by a first UE, a measuring module, configured to measure RSRP based on the received sidelink physical channel and/or the sidelink physical signal, and a feeding back module configured to feed back the measured RSRP to the first UE, so that the first UE determines an open loop transmitting power according to the fed back RSRP and the acquired parameter configuration information for sidelink open loop power control.

Alternatively, the feeding back module may be configured to feed back the measured RSRP to the first UE through a PC5 interface, or, to feed back the measured RSRP to the first UE through a Uu interface, wherein the feeding back module may be further configured to feed back the measured RSRP to the first UE through a PSFCH, wherein the sidelink control information of the PSFCH includes at least one of an ID of the first UE and an ID of the second UE, or, to feed back the measured RSRP to the first UE through a unicast PSSCH and/or a broadcast PSSCH.

Alternatively, the sidelink physical channel and/or the sidelink physical signal, which is used for measuring RSRP by the second UE, is a broadcast service transmitted by the first UE, or, the sidelink physical channel and/or the sidelink physical signal, which is used for measuring RSRP by the second UE, is a groupcast service transmitted by the first UE, or, the sidelink physical channel and/or the sidelink physical signal, which is used for measuring RSRP by the second UE, is a broadcast service and a groupcast service transmitted by the first UE, wherein the broadcast service and the groupcast service use the same transmitting power, or, the sidelink physical channel and/or the sidelink physical signal, which is used for measuring RSRP by the second UE, is a broadcast service, a groupcast service and/or a unicast service transmitted by the first UE, wherein a transmitting power of demodulation reference signal DMRS of the broadcast service, the groupcast service and/or the unicast service are the same.

Alternatively, the feeding back module may be configured to transfer the L1-RSRP to high layer and generating an L3-RSRP after performing layer 3 filtering, and feed back the generated L3-RSRP to the first UE through a high layer signaling, so that the first UE calculates the open loop transmitting power based on the L3-RSRP, when the measured RSRP is an L1-RSRP, or, the feeding back module may be configured to feed back the L1-RSRP to the first UE through a physical layer signaling, so that the first UE generates an L3-RSRP according to the L1-RSRP and calculates the open loop transmitting power based on the L3-RSRP, and/or, so that the first UE calculates the open loop transmitting power based on the L1-RSRP, when the measured RSRP is an L1-RSRP.

Alternatively, the terminal for performing power control may further include a feedback determining module configured to determine whether to measure and feed back the RSRP on the resource pool according to the parameter configuration information of the side open loop power control corresponding to the resource pool, or, to trigger the second UE to measure and feed back the RSRP of the first UE via a dedicated signaling, wherein the dedicated signaling includes a dedicated signaling transmitted by the base station and/or a dedicated signaling transmitted by the first UE, or, to trigger the second UE to measure and feed back the RSRP of the first UE in a manner in which the first UE broadcasts the PSSCH notification.

Alternatively, the feeding back module may be configured to feed back the measured RSRP to the first UE in all conditions, or, to feed back the measured RSRP to the first UE when meeting a pre-defined or pre-configured condition, so that the first UE calculates the open loop transmitting power based on a minimum value of all received RSRPs and the acquired parameter configuration information for sidelink open loop power control, when the power control terminal is used in the groupcast service.

According to the exemplary embodiment of the present disclosure, there is provided a computer readable storage medium stored with a computer program, when the computer program is being executed, the power control methods according to the present disclosure is implemented.

According to the exemplary embodiment of the present disclosure, there is provided a data transmission apparatus, including a processor, a memory stored with a computer program, when the computer program is being executed, the power control methods according to the present disclosure is implemented.

The power control methods and the terminals for performing power control according to the exemplary embodiment of the present disclosure, may acquire the parameter configuration information for sidelink open loop power control, transmit a sidelink physical channel and/or a sidelink physical signal to a second UE, so that the second UE measures an RSRP based on the received sidelink physical channel and/or the sidelink physical signal, and feeds back the measured RSRP to the first UE, receive the RSRP fed back by the second UE; calculate an open loop transmitting power based on the received RSRP and the acquired parameter configuration information for sidelink open loop power control, and thus may transmit the PSCCH, the PSSCH, and/or the PSFCH to the second UE based on the calculated open loop transmitting power.

Additional aspects and/or advantages of the present general inventive concept will be set forth in part in the description which follows, still a portion will be apparent from the description or may be known through the practice of the present general inventive concept.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects and features of the exemplary embodiments of the present disclosure will become more apparent from the following description taken in conjunction with the accompanying drawings that exemplarily illustrates embodiments, in which.

DETAILED DESCRIPTION

Figure 1:
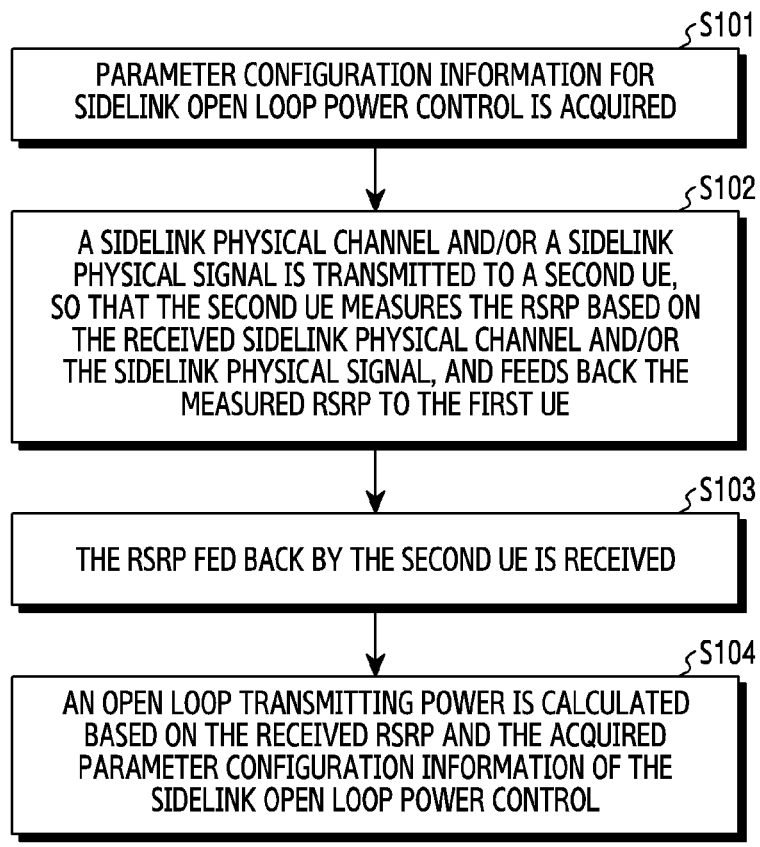
FIG. 1 illustrates a flowchart of a power control method, according to an exemplary embodiment of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for performing power control in a wireless communication system.

The terms referring to parameters, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Reference will now be made in detail to exemplary embodiments of the present disclosure, and examples of the embodiments are illustrated in the accompanying drawings, wherein same reference numerals refer to same parts throughout. The embodiments described below with reference to the accompanying drawings are intended to be illustrative of the present disclosure and are not to be construed as limitation of the present disclosure.

Those skilled in the art will understood that, the singular forms "a", "an", and "the" may also include the plural forms as well, unless the context specially indicates otherwise. It will be further understood that the phrase "comprise" refers to the presence of stated features, integers, steps, operations, elements, and/or components, but do not preclude the presence or addition of one or more other features, integers, steps, operations, elements, components, and/or groups thereof. It will be understood that, when an element is referred to as being "connected" or "coupled" to another element, it may be directly connected or coupled to the other element, or there may be intermediate element. Further, "connected" or "coupled" as used herein may include either a wireless connection or a wireless coupling. The phrase "and/or" used herein includes all or any one and all combinations of one or more of the associated listed.

Those skilled in the art will understood that, all terms (including technical terms and scientific terms) used herein have the same meaning as commonly understood by one of ordinary skill in the art to which the disclosure belongs, unless otherwise defined. It should also be understood that, terms such as those defined in a general dictionary should be understood to have meaning consistent with the meaning in the context of the prior art, and will not be explained by idealized or overly formal meaning unless specifically defined as here.

Those skilled in the art may understand that, the "terminal" and "terminal equipment" used herein could not only be an equipment including a wireless signal receiver, that is, an equipment having only a wireless signal receiver without a transmitting capability, but also could be an equipment including hardware for transmitting and receiving, that is, an equipment having hardware for receiving and transmitting and being capable of conducting a bidirectional communication over a bidirectional communication link. Such equipments may include a cellular communication equipment or other type of communication equipment, which includes a single line display or a group-line display or without a group-line display; a Personal Communications Service (PCS), which may combine functions of voice processing, data processing, fax, and/or data communication; a Personal Digital Assistant (PDA), which may include a radio frequency receiver, a pager, Internet/Intranet access, a web browser, a notepad, a calendar, and/or a Global Positioning System (GPS) receiver; a conventional laptop and/or a palmtop computer or other equipments, which is a conventional laptop or palmtop computer or other equipments having and/or including a radio frequency receiver. The "terminal", "terminal equipment" used herein may be portable, transportable, installed in a vehicle (aviation, sea and/or land), or adapted and/or configured to operate locally, and/or run in any other location on the earth and/or space in a distributed form. The "terminal" and "user equipment" used herein may also be a communication terminal, an internet terminal, a music/video playing terminal, and may be, for example, a PDA, a Mobile Internet Device (MID), and/or a mobile phone with a music/video display function, and may also be a smart TV, a set-top box and the like.

FIG. 1 illustrates a flowchart of a power control method, according to one exemplary embodiment of the present disclosure, wherein the power control method is performed by a first UE. The power control method illustrated in FIG. 1 may be used in the 5G NR V2X system, and is different from the open loop power control method of the LTE V2X system in that the power control herein is based on a sidelink pathloss, that is, an open loop transmitting power is calculated according to a sidelink pathloss between two UEs (the first UE and a second UE). The power control method illustrated in FIG. 1 may be mainly used in a unicast service of a sidelink communication system, that is, the open loop transmitting power is calculated according to a pathloss between a transmitting (TX) UE and a receiving (RX) UE, and the calculated open loop transmitting power is used in a unicast PSCCH/PSSCH and/or PSFCH. The power control method illustrated in FIG. 1 may also be used in a groupcast service, that is, the open loop transmitting power is calculated according to a maximum sidelink pathloss for sidelink pathlosses between the TX UE and the RX UEs in the RX UE group, and the calculated open loop transmitting power is used in a groupcast PSCCH/PSSCH. The power control method illustrated in FIG. 1 may also be used in a broadcast service, that is, the open loop transmitting power is calculated according to a maximum sidelink pathloss for sidelink pathlosses between the TX UE and the RX UEs within a minimum communication range of the broadcast service, and the calculated open loop transmitting power is used in a broadcast PSCCH/PSSCH.

A first UE in FIG. 1 may also be referred to as a TX UE, which is a TX UE that applies sidelink transmission of the open loop power control, that is, a subject that performs the open loop power control, and a second UE may also be referred to as an RX UE, which is an RX UE that applies sidelink transmission of the open loop power control, that is, a subject that performs RSRP feedback.

Referring to FIG. 1, in step S101, parameter configuration information for sidelink open loop power control is acquired.

Alternatively, for UEs in coverage of the cellular network, the parameter configuration information for sidelink open loop power control may be configured by UE-specific Radio Resource Control (RRC) signaling of a Uu interface (an interface between the first UE and a base station), that is, configured by the base station for the first UE. That is, when the first UE is in coverage of the cellular network, acquiring parameter configuration information for sidelink open loop power control includes: receiving the parameter configuration information for sidelink open loop power control configured by the UE-specific RCC signaling transmitted by the base station, through a Uu interface between the first UE and the base station. Alternatively, for UEs outside of coverage of the cellular network, the parameter configuration information for sidelink open loop power control is sidelink pre-configuration parameters, that is, the manufacturer hard-codes the pre-configured parameters in the equipment of the first UE. That is, when the first UE is outside of coverage of the cellular network, acquiring parameter configuration information for sidelink open loop power control includes: acquiring the parameter configuration information for sidelink open loop power control from the sidelink pre-configuration parameters of the first UE.

The parameter configuration information for sidelink open loop power control includes at least one of a sidelink pathloss factor alphaSL-V2X and a target receiving power p0SL-V2X.

Here, the sidelink pathloss factors alphaSL-V2X is used for indicating a compensation factor of the sidelink pathloss, for example, the value range of the sidelink pathloss factors alphaSL-V2X may be {0.4,0.5,0.6,0.7,0.8,0.9, 1.0}. The target receiving power p0SL-V2X is used for indicating the target receiving power of open loop power control, for example, (when the maximum rated transmitting power of the UE is 31 dBm), the value range of the target receiving power p0SL-V2X may be −126 dBm~31 dBm, or (when the maximum rated transmitting power of the UE is 23 dBm), the value range of the target receiving power p0SL-V2X may be −126 dBm~23 dBm.

Alternatively, the parameter configuration information for sidelink open loop power control is associated with a configuration of a resource pool, the acquired parameter configuration information for sidelink open loop power control is parameter configuration information for sidelink open loop power control corresponding to the resource pool, that is, different resource pools are individually configured with resource allocation parameters. The parameter configuration information for sidelink open loop power control is included in the configuration information of the resource pool, and the UE calculates the open loop transmitting power according to corresponding open loop power control parameter. If a resource pool is configured with open loop control parameters, it indicates that the UE which transmits unicast (or groupcast/broadcast) data on this resource pool should perform the open loop power control based on the sidelink pathloss, if no open loop power control parameter is configured, it indicates that the UE which transmits unicast (or groupcast/broadcast) data on this resource pool does not need to perform the open loop power control based on the sidelink pathloss.

Alternatively, the parameter configuration information for sidelink open loop power control is associated with Channel Busy Ratio (CBR) (or interference degree) on the resource pool, the acquired parameter configuration information for sidelink open loop power control is parameter configuration information of the sidelink open loop power control corresponding to the CBR measured by the first UE on the resource pool, that is, different open loop power control parameters may be used in different CBR sections. For example, a resource pool may be configured with multiple sidelink pathloss factors alphaSL-V2X and/or multiple target receiving powers p0SL-V2X, the multiple sidelink pathloss factors alphaSL-V2X and/or the multiple target receiving powers p0SL-V2X are respectively used in different CBR sections, and the UE selects corresponding open loop power control parameters according to the section in which the CBR measured on the resource pool is located. The motivation for this design is that, when the interference on a resource pool is severe, the open loop transmitting power should be lowered correspondingly. For example, the target receiving power p0SL-V2X is lowered and/or the sidelink pathloss factor alphaSL-V2X is lowered.

Alternatively, whether to perform an open loop power control based on sidelink pathloss by the first UE is determined according to the CBR measured on the resource pool by the first UE, even if the resource pool of the first UE is configured with the parameter configuration information of the sidelink open loop power control. For example, one resource pool may be configured with one sidelink pathloss factor alphaSL-V2X and/or one target received power p0SL-V2X. When the measured CBR exceeds a pre-defined or pre-configured threshold, the first UE performs the open loop power control based on the sidelink pathloss with respect to the unicast (or groupcast/broadcast) transmission. Otherwise, the first UE does not need to perform the open loop power control based on the sidelink pathloss with respect to the unicast (or groupcast/broadcast) transmission. The motivation for this design is that, when the interference on a resource pool is severe, the open loop power control based on the sidelink pathloss may reduce the transmitting power on the basis of ensuring the reliability of the sidelink communication, thereby alleviating the interference condition on the resource pool.

In step S102, a sidelink physical channel and/or a sidelink physical signal is transmitted to a second UE, so that the second UE measures a Reference Signal Received Power (RSRP) based on the received sidelink physical channel and/or the sidelink physical signal, and feeds back the measured RSRP to the first UE.

The sidelink physical channel includes at least one of the Physical Sidelink Control Channel (PSCCH), the Physical Sidelink Shared Channel (PSSCH), and the Physical Sidelink Feedback Channel (PSFCH). Here, the PSCCH, the PSSCH, and the PSFCH may use the same or different parameter configuration information of the sidelink open loop power control. Alternatively, the PSCCH, the PSSCH, and the PSFCH use the same parameter configuration information of the sidelink open loop power control, that is, the PSCCH, the PSSCH, and the PSFCH share the same parameter configuration information of the sidelink open loop power control. Alternatively, the PSCCH and the PSSCH share the same parameter configuration information of the sidelink open loop power control, and the PSFCH is configured with parameter configuration information of the sidelink open loop power control separately from the PSCCH and the PSSCH. Alternatively, the PSCCH, the PSSCH, and the PSFCH are individually configured with parameter configuration information of the sidelink open loop power control. Alternatively, the PSCCH and the PSFCH share the same parameter configuration information of the sidelink open loop power control, and the PSSCH is configured with parameter configuration information of the sidelink open loop power control separately from the PSCCH and the PSFCH.

Alternatively, the unicast is configured to apply the open loop power control based on the sidelink pathloss, and the PSCCH/PSSCH transmitted by the first UE for the second UE to measure RSRP may be at least one of the following: broadcast PSCCH/PSSCH transmitted by the first UE, the broadcast PSCCH/PSSCH here does not apply the open loop power control based on the sidelink pathloss; groupcast PSCCH/PSSCH transmitted by the first UE, the second UE belongs to the target RX UE of the groupcast transmission, and the groupcast PSCCH/PSSCH here does not apply the open loop power control based on the sidelink pathloss; groupcast PSCCH/PSSCH transmitted by the first UE, and the second UE may belong to the target RX UE of the groupcast transmission, or may not belong to the target RX UE of the groupcast transmission, and the groupcast PSCCH/PSSCH here does not apply the open loop power control based on the sidelink pathloss; unicast PSCCH/PSSCH transmitted by the first UE to the second UE, and the unicast PSCCH/PSSCH occurs before the second UE feeds back the RSRP for the first time, that is, the first UE has not received the RSRP fed back by the second UE, and the unicast PSCCH/PSSCH has not applied the open loop power control, but uses the initial transmitting power. When the second UE measures the L3-RSRP based on the above items, it means that the above items use the same transmitting power, that is, broadcast without applying open loop power control based on the sidelink pathloss and transmitted by the first UE, groupcast without applying open loop power control based on the sidelink pathloss and transmitted by the first UE, and unicast using the initial transmitting power and transmitted by the first UE to the second UE, use the same transmitting power. Alternatively, the unicast and/or the groupcast is configured to apply the open loop power control based on the sidelink pathloss, but the broadcast does not apply the open loop power control based on the sidelink pathloss, and the broadcast PSCCH/PSSCH transmitted by the first UE may be used for the second UE to measure RSRP, that is, the second UE measures RSRP on the broadcast PSCCH/PSSCH transmitted by the first UE, and feeds back the RSRP to the first UE.

In one example, one resource pool is configured with the parameter configuration information of the sidelink open loop power control. Only the unicast service and/or groupcast service apply the open loop power control based on the sidelink pathloss, while the broadcast service does not apply the open loop power control based on the sidelink pathloss. When an RX UE on the resource pool determines that a unicast link and/or a groupcast link is to be established with a certain TX UE, that is, the RX UE may know whether the RX UE itself is a target RX UE of a unicast service transmitted by a certain TX UE, or whether it belongs to a target RX UE group of a groupcast service transmitted by a certain TX UE, the RX UE may measure the corresponding RSRP based on the broadcast PSCCH/PSSCH transmitted by the TX UE.

Alternatively, the unicast is configured to apply the open loop power control based on the sidelink pathloss, but the groupcast does not apply the open loop power control based on the sidelink pathloss, and the groupcast PSCCH/PSSCH transmitted by the first UE may be used for the second UE to measure RSRP, that is, the second UE measures RSRP on the groupcast PSCCH/PSSCH transmitted by the first UE, and feeds the RSRP back to the first UE. In one example, a target RX UE group of the groupcast PSCCH/PSSCH for the second UE to measure RSRP may include the second UE, or may not include the second UE. If the second UE is not included, the second UE does not need to decode the PSSCH, but still uses it for the RSRP measurement. In another example, a target RX UE group of groupcast PSCCH/PSSCH for the second UE to measure RSRP includes the second UE, that is, the second UE also needs to decode the groupcast PSSCH for measuring RSRP.

In one example, one resource pool is configured with the parameter configuration information of the sidelink open loop power control. Only the unicast service applies the open loop power control based on the sidelink pathloss, and the broadcast service and the groupcast service do not apply the open loop power control based on the sidelink pathloss. When an RX UE on the resource pool determines that a unicast link and/or groupcast link is to be established with a certain TX UE, the RX UE may know whether the RX UE itself is a target RX UE of a unicast service transmitted by a certain TX UE, the RX UE may measure the corresponding RSRP based on the broadcast and/or the groupcast PSCCH/PSSCH transmitted by the TX UE.

Alternatively, the unicast is configured to apply the open loop power control based on the sidelink pathloss, but the groupcast and the broadcast do not apply the open loop power control based on the sidelink pathloss, and the broadcast service and the groupcast service use the same transmitting power. The groupcast and the broadcast PSCCH/PSSCH transmitted by the first UE may be simultaneously used for the second UE to measure RSRP, that is, the second UE measures RSRP on both of the groupcast and the broadcast PSCCH/PSSCH transmitted by the first UE, and feeds back the RSRP to the first UE. If the RSRP fed back to the first UE by the second UE is an L3-RSRP, an L1-RSRP used to generate the L3-RSRP may be measured based on the broadcast PSCCH/PSSCH transmitted by the first UE, or may be measured based on the groupcast PSCCH/PSSCH transmitted by the first UE.

Alternatively, the PSCCH/PSSCH transmitted by the first UE for the second UE to measure RSRP may be a broadcast service, a groupcast service, and/or a unicast service transmitted by the first UE, and regardless of whether open loop power control is applied, and regardless of whether the target RX UE group of the groupcast service transmitted by the first UE for measuring RSRP includes the second UE, and regardless of whether the target RX UE of the unicast service transmitted by the first UE for measuring RSRP is the second UE. Here, the open loop power control based on the sidelink pathloss specified in the system is applied only to a data signal of the PSCCH/PSSCH/PSFCH, and is not applied to a DMRS signal of the PSCCH/PSSCH/PSFCH, that is, the transmitting power of the DMRS signal maintains the same, and the transmitting power of the DMRS signal of the broadcast, the groupcast, and/or the unicast are the same.

In step S103, the RSRP fed back by the second UE is received.

Alternatively, when receiving the RSRP fed back by the second UE, the RSRP fed back by the second UE through a PC5 interface may be received, or, the RSRP fed back by the second UE through a Uu interface may be received. When receiving the RSRP fed back by the second UE through a PC5 interface, the RSRP fed back by the second UE through the PSFCH may be received, wherein the sidelink control information of the PSFCH includes at least one of an ID of the first UE and an ID of the second UE, or, the RSRP fed back by the second UE through a unicast PSSCH and/or a broadcast PSSCH may be received.

Alternatively, the RSRP fed back to the first UE by the second UE is an L3-RSRP, that is, the second UE measures an L1-RSRP based on the sidelink physical channel and/or signal transmitted by the first UE, and transmits the L1-RSRP to high layer, and then generates the L3-RSRP after performing layer 3 filtering. The L3-RSRP may be regarded as the average value of the L1-RSRP in a time window, and the first UE calculates a pathloss between the first UE and the second UE based on the L3-RSRP fed back by the second UE.

Alternatively, the RSRP fed back to the first UE by the second UE is an L1-RSRP, and the first UE generates an L3-RSRP after performing layer 3 filtering based on the received L1-RSRP which is fed back by the second UE, and then the L3-RSRP is used to calculate a pathloss between the first UE and the second UE.

Alternatively, the RSRP fed back to the first UE by the second UE is an L1-RSRP, and the first UE calculates a pathloss between the first UE and the second UE based on the L1-RSRP fed back by the second UE.

Alternatively, the RSRP fed back to the first UE by the second UE may be an L1-RSRP or may be an L3-RSRP, that is, the RSRP may be an RSRP measured on one time-slot, or may be an average of RSRP measured in a period of time, which depends entirely on the implementation of the second UE.

Coefficients of a layer 3 filter for generating the L3-RSRP are pre-defined values or pre-configured values. If the coefficients of the layer 3 filter are pre-configured, the pre-configuration may be optional, and if the coefficients of the layer 3 filter are not configured and a default value is used. The open loop power control based on the sidelink pathloss is mainly used in the unicast transmission, and may also be used in the groupcast transmission. If the open loop power control based on the sidelink pathloss is used in the groupcast transmission, when receiving the RSRP fed back by the second UE, an RSRP fed back by all second UEs may be received, or an RSRP fed back by the second UE meeting the pre-defined conditions or pre-configured conditions may be received.

In a groupcast transmission, data transmitted by the first UE (i.e., the TX UE) is received by a group of second UEs, that is, there is a plurality of second UEs (that is, RX UEs). The groupcast is classified into two types according to whether a number of RX UEs. In one type of groupcast, the number of RX UEs is not determined, that is, the TX UE does not know the number of RX UEs; in another type of groupcast, the number of RX UEs is determined, that is, the TX UE knows the number of RX UEs, and even knows the ID of each RX UE.

Alternatively, all RX UEs of the groupcast transmission need to feed back an RSRP to the TX UE, and the TX UE calculates the open loop transmitting power based on a sidelink pathloss estimated from the minimum RSRP among all the received RSRPs, that is, the open loop transmitting power is calculated based on a maximum sidelink pathloss to ensure the reception reliability of all RX UEs for the groupcast transmission. This method is applicable to the type of groupcast in which the number of the RX UEs is determined.

Alternatively, not all RX UEs of the groupcast transmission need to feed back an RSRP to the TX UE, that is, only a portion of the RX UEs feed back the RSRP to the TX UE, and whether an RX UE needs to feed back the RSRP is determined by the RX UE through a pre-defined rule or pre-configured rule. For example, the TX UE is pre-configured with a condition (or an event) for determining whether to feed back an RSRP. When an RX UE meets the condition (or event), it feeds back the RSRP. Otherwise, it does not need to feed back the RSRP. The condition (or event) for triggering the RSRP feedback of the portion of the RX UEs may be related to a distance from the TX UE to the RX UE, or may be related to the pathloss between the TX UE and the RX UE, that is, related to the RSRP measured by the RX UE.

In one example, only the RX UE whose distance from the TX UE is less than a pre-configured value feeds back the RSRP, and/or only the RX UE for which the measured RSRP is greater than a pre-configured value feeds back the RSRP, that is, the condition (or event) for triggering the RSRP feedback of the portion of the RX UEs is: Range≤Range_TH and/or RSRP≥RSRP_TH.

Figure 2:
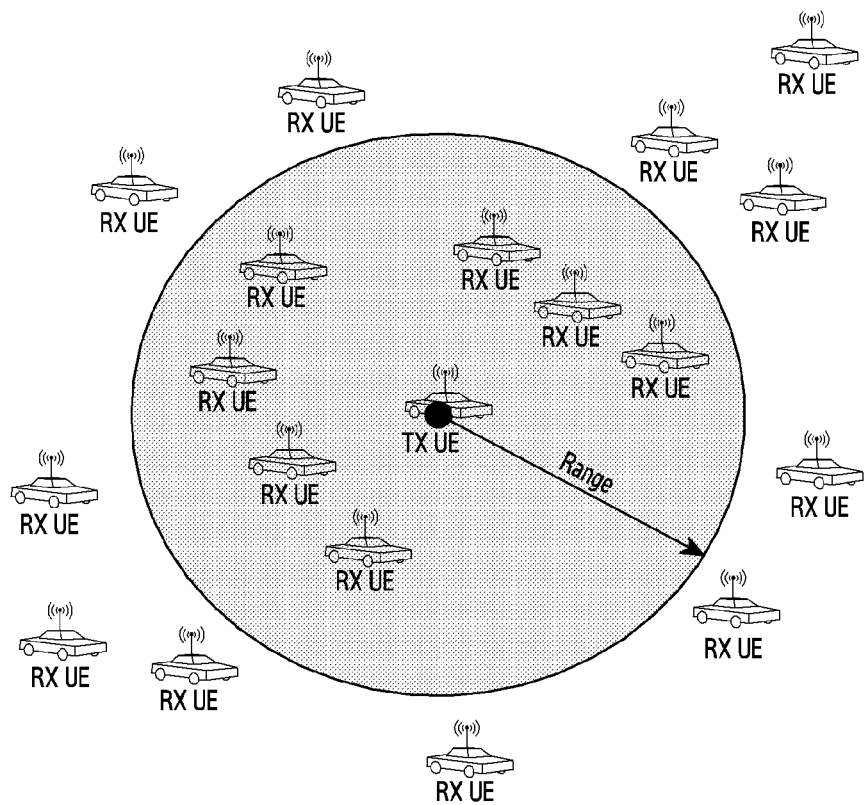
FIG. 2 illustrates a schematic diagram of RX UEs located within a circular area feedback an RSRP, according to an exemplary embodiment of the present disclosure.

Here, the Range is a distance between the TX UE and the RX UE, the Range_TH is a pre-configured threshold of the distance between the TX UE and the RX UE, the RSRP is an RSRP for a signal from the TX UE measured by the RX UE, and the RSRP_TH is a pre-configured threshold value for the RSRP. FIG. 2 illustrates a schematic diagram of RX UEs within a circular area feeding back an RSRP, according to an exemplary embodiment of the present disclosure. As shown in FIG. 2, only RX UEs within a circular area, with a radius of the Range and centered on the TX UE, feed back an RSRP, and RX UEs outside of the circular area do not need to feed back the RSRP.

In another example, only the RX UE whose distance from the TX UE is greater than a pre-configured value feeds back the RSRP, and/or only the RX UE for which the measured RSRP is less than a pre-configured value feed back the RSRP, that is, the condition (or event) for triggering the RSRP feedback of the portion of the RX UEs is: Range≥Range_TH and/or RSRP≤RSRP_TH.

Figure 3:
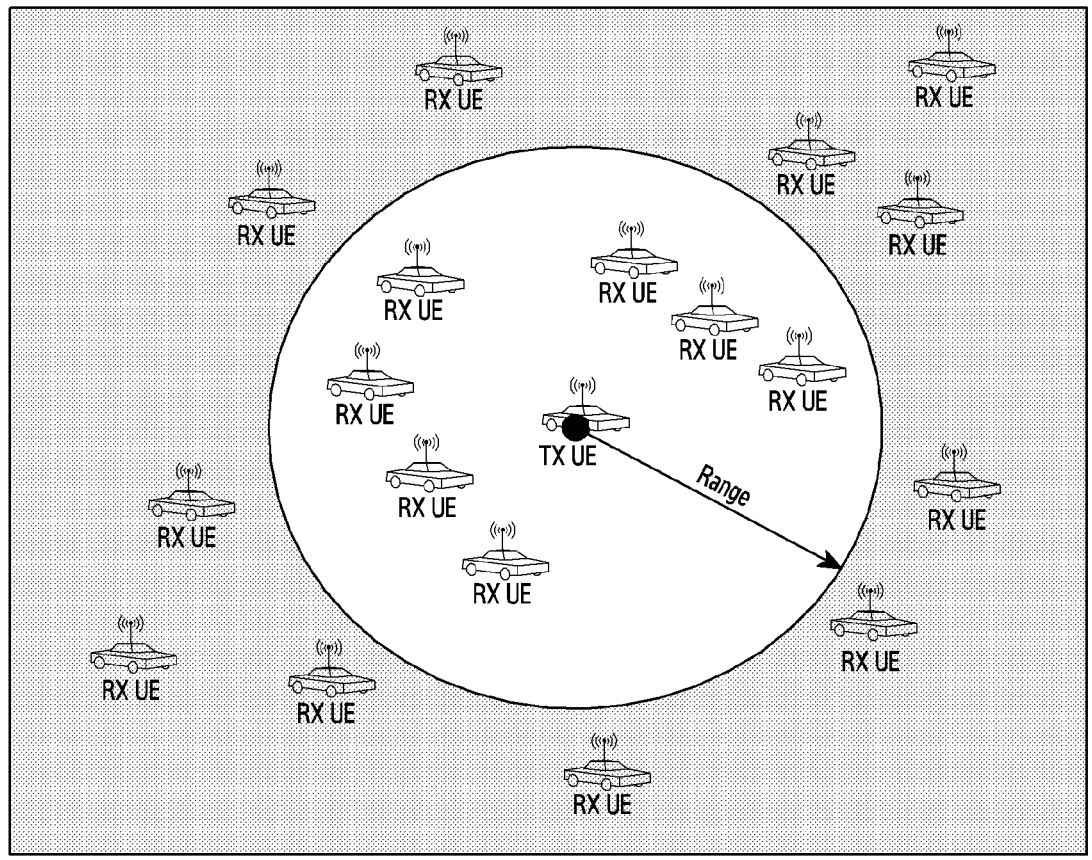
FIG. 3 illustrates a schematic diagram of RX UEs located outside a circular area feedback an RSRP, according to an exemplary embodiment of the present disclosure.

Here, the Range is the distance between the TX UE and the RX UE, the Range_TH is the pre-configured threshold of the distance between the TX UE and the RX UE, the RSRP is the RSRP for a signal from the TX UE measured by the RX UE, and the RSRP_TH is the pre-configured threshold value for the RSRP. FIG. 3 illustrates a schematic diagram of RX UEs outside a circular area feeding back an RSRP, according to an exemplary embodiment of the present disclosure As shown in FIG. 3, only RX UEs outside of the circular area, with a radius of the Range and centered on the TX UE, feed back the RSRP, and RX UEs within the circular area do not need to feed back the RSRP.

In yet another example, only the RX UE whose distance from the TX UE is within a pre-configured range feeds back the RSRP, and/or only the RX UE for which the measured RSRP is within a pre-configured range feeds back the RSRP, that is, the condition (or event) for triggering the RSRP feedback of the portion of the RX UEs is: Range 1≤Range≤Range 2 and/or RSRP 1≤RSRP≤RSRP 2.

Figure 4:
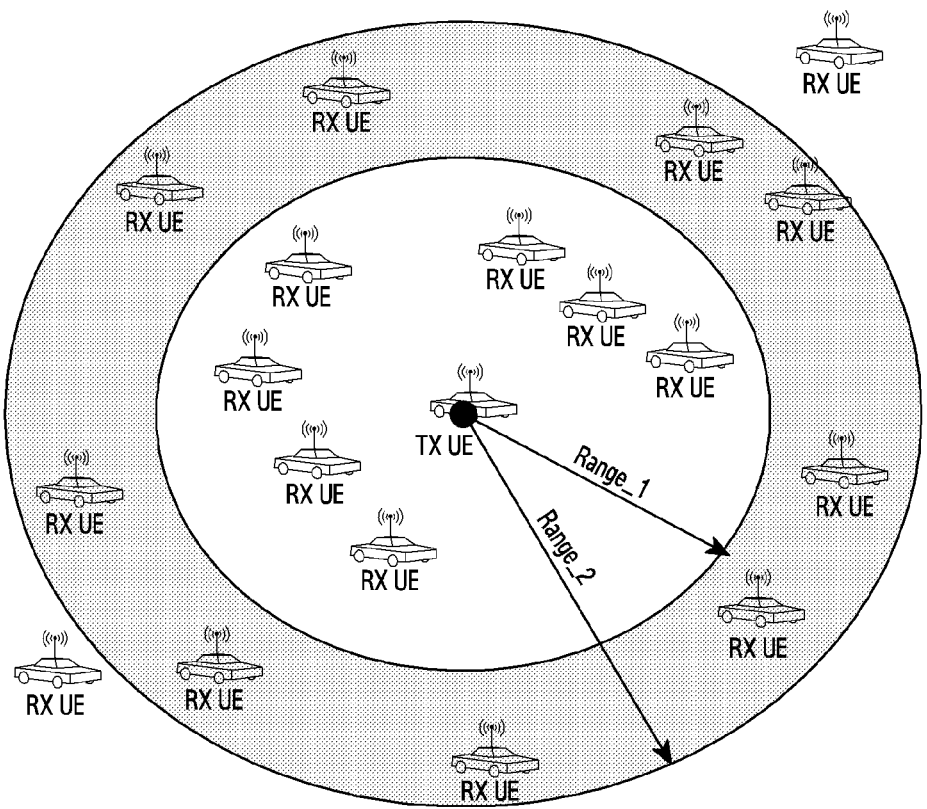
FIG. 4 illustrates a schematic diagram of RX UEs located within an annular area feedback an RSRP, according to an exemplary embodiment of the present disclosure.

Here, the Range is the distance between the TX UE and the RX UE, the {Range_1, Range_2} is the pre-configured threshold of the distance between the TX UE and the RX UE, the RSRP is the RSRP for a signal from the TX UE measured by the RX UE, and the {Range_1, Range_2} is the pre-configured threshold value of the RSRP. FIG. 4 illustrates a schematic diagram of RX UEs within an annular area feeding back an RSRP, according to an exemplary embodiment of the present disclosure. As shown in FIG. 4, only the RX UE within an annular, with radiuses of the Range_1 and Range_2 and centered on the TX UE, feeds back the RSRP, and the RX UE outside of the annular area do not need to feed back the RSRP.

Or, the condition (or event) for triggering the RSRP feedback of a portion of the RX UEs is: Range_TH−Range_delta≤Range≤Range_TH+Range_delat and/or RSRP_TH−RSRP_delta≤RSRP≤RSRP_TH+RSRP_delta.

Here, the Range is the distance between the TX UE and the RX UE, the Range_TH is the pre-configured threshold of the distance between the TX UE and the RX UE, the RSRP is the RSRP for a signal from the TX UE measured by the RX UE, the RSRP_TH is the pre-configured threshold values of the RSRP, and the RSRP_delta is a pre-configured value of a size of the annular area for adjusting the pathloss.

In step S104, an open loop transmitting power is calculated based on the received RSRP and the acquired parameter configuration information of the sidelink open loop power control.

When calculating the open loop transmitting power, configuration information of other transmitting parameters may also be required. For example, when calculating the open loop transmitting power, the maximum transmitting power (that is, maxTxpower) may also be required. The maximum transmitting power is used to limit the maximum transmitting power of the first UE, and it may range from −41 dBm to 31 dBm (when the maximum rated transmitting power of the UE is 31 dBm), or it may range from −41 dBm to 23 dBm (when the maximum rated transmitting power of the UE is 23 dBm). The maximum transmitting power may also be associated with a priority of the PSSCH, that is, different PSSCH priorities are configured with different maximum transmitting power values. The maximum transmitting power may also be associated with a CBR measured on a resource pool, that is, different CBR sections correspond to different maximum transmitting power values. The maximum transmitting power is an optional configuration and may or may not be configured.

Alternatively, if the open loop power control based on the sidelink pathloss is used in the groupcast transmission, when calculating the parameter configuration information of the sidelink loop open loop power control based on the received RSRP and the acquired parameter configuration information of the sidelink loop open loop power, the parameter configuration information of the sidelink open loop power control may be calculated based on the minimum value of all received RSRPs and the acquired parameter configuration information of the sidelink loop open loop power.

Alternatively, if the RSRP fed back by the second UE is an L3-RSRP, generated after performing layer 3 filtering on an L1-RSRP and fed back by a high layer signaling, when calculating the open loop transmitting power based on the received RSRP and the acquired parameter configuration information of the sidelink open loop power control, the open loop transmitting power may be calculated based on the L3-RSRP and the acquired parameter configuration information of the sidelink open loop power control.

Alternatively, if the RSRP fed back by the second UE is an L1-RSRP fed back via a physical layer signaling, when calculating the open loop transmitting power based on the received RSRP and the acquired parameter configuration information of the sidelink open loop power control, an L3-RSRP may be first generated based on the fed back L1-RSRP, and then the open loop transmitting power is calculated based on the L3-RSRP and the acquired parameter configuration information of the sidelink open loop power control. Or, when calculating the open loop transmitting power based on the received RSRP and the acquired parameter configuration information of the sidelink open loop power control, the open loop transmitting power may be calculated based on the fed back L1-RSRP and the acquired parameter configuration information of the sidelink open loop power control.

Alternatively, when calculating the open loop transmitting power based on the received RSRP and the acquired parameter configuration information of the sidelink open loop power control, an sidelink pathloss between the first UE and the second UE may be first calculated based on the received RSRP; and then the open loop transmitting power is calculated based on the calculated sidelink pathloss and the acquired parameter configuration information of the sidelink open loop power control.

Alternatively, when calculating the open loop transmitting power based on the received RSRP and the acquired parameter configuration information of the sidelink open loop power control, for an OFDM symbols including both the PSCCH and the PSSCH, that is, the PSCCH and the PSSCH are multiplexed in the same OFDM symbol by frequency division, the PSCCH may be power boosted with respect to the PSSCH. For example, an Energy Per Resource Element (EPRE) of the PSCCH may be 3 dB higher than the EPRE of the PSSCH. Then, the open loop transmitting power for PSCCH is calculated according to the following formula:

$$P_{PSSCH} = 10\log_{10}\left(\frac{M_{PSSCH}}{M_{PSSCH} + 10^{\frac{3}{10}} \times M_{PSCCH}}\right) + A.$$

If the maximum transmitting power (that is, maxTxpower) in high layer parameters is configured, $$A = \min\{P_{CMAX}, P_{MAX\_CBR}, 10\log_{10}\left(M_{PSSCH} + 10^{\frac{3}{10}} \times M_{PSCCH}\right) +$$
$$P_{O\_PSSCH} + \alpha_{PSSCH} \cdot PL_{SL}\}, \text{ otherwise}$$
$$A = \min\{P_{CMAX}, 10\log_{10}\left(M_{PSSCH} + 10^{\frac{3}{10}} \times M_{PSCCH}\right) +$$
$$P_{O\_PSSCH} + \alpha_{PSSCH} \cdot PL_{SL}\}.$$

Correspondingly, the open loop transmitting power for PSCCH is calculated according to the following formula:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + B.$$

If the maximum transmitting power (that is, maxTxpower) in high layer parameters is configured, $$B = \min\{P_{CMAX}, P_{MAX\_CBR}, 10\log_{10}\left(M_{PSSCH} + 10^{\frac{3}{10}} \times M_{PSCCH}\right) +$$
$$P_{O\_PSSCH} + \alpha_{PSSCH} \cdot PL_{SL}\}, \text{ otherwise}$$
$$B = \min\{P_{CMAX}, 10\log_{10}\left(M_{PSSCH} + 10^{\frac{3}{10}} \times M_{PSCCH}\right) +$$
$$P_{O\_PSSCH} + \alpha_{PSSCH} \cdot PL_{SL}\}.$$

For an OFDM symbol including only the PSSCH, or, for an OFDM symbol including both the PSCCH and the PSSCH while the PSCCH is not power boosted with respect to the PSSCH, the open loop transmitting power for PSSCH is calculated according to the following formula:

If the maximum transmitting power (that is, maxTxpower) in high layer parameters is configured, $P_{SSCH}=\min\{P_{CMAX}, P_{MAX\_CBR}, 10\log_{10} \cdot M_{PSSCH} + P_{O\_PSSCH} + \alpha_{PSSCH} \cdot PL_{SL}\}$, otherwise $P_{PSSCH}=\min\{P_{CMAX}, 10\log_{10} \cdot M_{PSSCH} + P_{O\_PSSCH} + \alpha_{PSSCH} \cdot PL_{SL}\}$.

Alternatively, For an OFDM symbol including only the PSSCH, or, for an OFDM symbol including both the PSCCH and the PSSCH while the PSCCH is not power boosted with respect to the PSSCH, the open loop transmitting power for PSSCH is calculated according to the following formula:

If the maximum transmitting power (that is, maxTxpower) in high layer parameters is configured, $P_{PSCCH}=\min\{P_{CMAX}, P_{MAX\_CBR}, 10\log_{10} \cdot M_{PSCCH} + P_{O\_PSCCH} + \alpha_{PSCCH} \cdot PL_{SL}\}$, otherwise $P_{PSCCH}=\min\{P_{CMAX}, 10\log_{10} \cdot M_{PSCCH} + P_{O\_PSCCH} + \alpha_{PSCCH} \cdot PL_{SL}\}$.

Here, the $P_{CMAX}$ is a rated maximum transmitting power of the first UE, the $M_{PSSCH}$ is a number of PRBs in a bandwidth occupied by the PSSCH, the $M_{PSCCH}$ is a number of PRBs in a bandwidth occupied by the PSCCH, which may be pre-defined or pre-configured by the system (for example, $M_{PSCCH}=2$), the $PL_{SL}$ is the calculated sidelink pathloss between the first UE and the second UE, which may be estimated by subtracting the RSRP value fed back by the second UE from the transmitting power of the first UE, that is, $PL_{SL}=\text{Power}_{TX}-\text{RSRP}_{feedback}$, the $P_{O\_PSSCH}$ and the $\alpha_{PSCCH}$ are open loop power control parameters corresponding to a PSSCH resource configuration and provided by high layer, the $P_{MAX\_CBR}$ is a maximum transmitting power value set based on the CBR measured on the resource pool where the PSSCH is located and the priority of the PSSCH. Here, the CBR is a measured value on the nth time-slot before the time-slot in which the PSSCH is located, and n is a pre-defined value.

Figure 5:
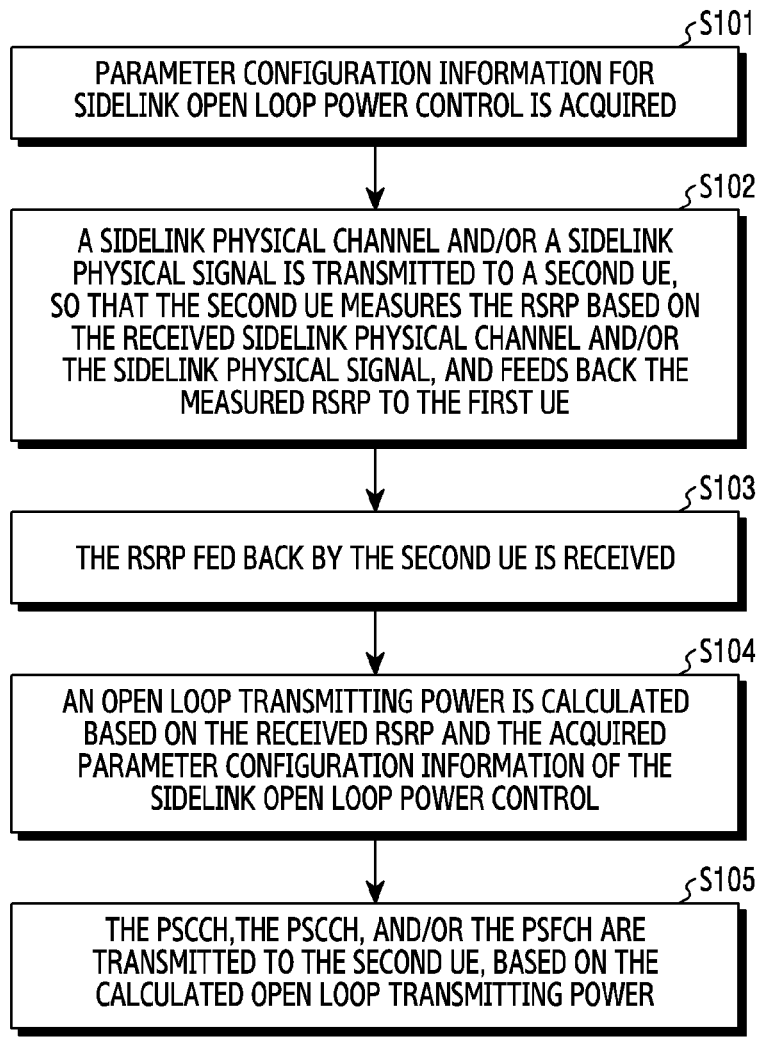
FIG. 5 illustrates a flowchart of a power control method, according to another exemplary embodiment of the present disclosure.

Alternatively, after step S104, the method may further include step S105. As shown in FIG. 5, in step S105, the PSCCH, the PSSCH, and/or the PSFCH are transmitted to the second UE, based on the calculated open loop transmitting power.

For V2X UEs in coverage of the cellular network, the broadcast transmission, the groupcast transmission, and the unicast transmission may be configured based on the open loop power control of the Uu interface downlink pathloss, that is, the open loop power control is based on the pathloss between the V2X UE and the base station. Moreover, except the broadcast transmission, the groupcast transmission and the unicast transmission may also be configured based on the open loop power control of the sidelink pathloss, that is, the open loop power control is based on a pathloss between two V2X UEs. Then, the open loop power control parameter of both the open loop power control based on the sidelink pathloss and the open loop power control based on the downlink pathloss may be configured, and the two are corresponding to different open loop power control parameter configurations, that is, the pathloss compensation factor alphaSL-V2X and the target receiving power p0SL-V2X are separately configured.

Alternatively, when both the open loop power control based on the sidelink pathloss and the open loop power control based on the downlink pathloss are configured with the open loop power control parameters separately, if it is assumed that the open loop transmitting power calculated based on the sidelink pathloss and the corresponding open loop power control parameter is $Power_{SL\_OLPC}$, the open loop transmitting power calculated based on the downlink pathloss and the corresponding open loop power control parameter is $Power_{DL\_OLPC}$, the UE determines the open loop transmitting power by a formula $Power=\min\{Power_{DL\_OLPC}, Power_{SL\_OLPC}\}$, that is, the UE selects the minimum value from the two as the open loop transmitting power. Therefore, a reliability of the sidelink transmission may not be guaranteed, but it is possible to guarantee both interference management of the Uu interface and interference management of the PC5 interface.

Or, the UE determines the open loop transmitting power by a formula $Power=\max\{Power_{DL\_OLPC}, Power_{SL\_OLPC}\}$ that is, the UE selects the maximum value from the two as the open loop transmitting power, then the reliability of the sidelink transmissions may be guaranteed, but not both the interference management of the Uu interface and the interference management of the PC5 interface may be guaranteed.

Or, the UE uses the $Power_{DL\_OLPC}$ as the open loop transmitting power, that is, the interference management of the Uu interface has a higher priority.

Or, the UE uses the $Power_{SL\_OLPC}$ as the open loop transmitting power, that is, the interference management of the PC5 interface has a higher priority.

Or, the UE selects one of the two as the open loop transmitting power according to a configured priority, for example, the system may be pre-configured such that the $Power_{SL\_OLPC}$ or the $Power_{DL\_OLPC}$ has a higher priority.

Or, the UE determines the open loop transmitting power by using a formula $Power=a*Power_{DL\_OLPC}+(1-a)*Power_{SL\_OLPC}$ that is, the UE calculates a linear weighted value of the two as the open loop transmitting power, here the coefficient a is a system pre-defined value or a system pre-configured value, ranging from 0 to 1.

After step S104, when the first UE transmits the unicast data to the second UE, the RSRP feedback of the second UE may have not been received by the first UE, which may be caused by various reasons, for example, the second UE does not receive the signaling of triggering the RSRP feedback; or, the second UE has still not measured the RSRP or the second UE has measured the RSRP but has still not fed back the RSRP; or, the RSRP fed back by the second UE is not successfully decoded. Due to the transmission delay requirement of the data, the first UE transmits the unicast data to the second UE before receiving the RSRP feedback of the second UE, because the pathloss between the first UE and the second UE cannot be estimated, the initial transmitting power may only be determined in other ways.

Alternatively, before the RSRP feedback of the second UE is obtained, the first UE uses a pre-defined or pre-configured value $P_{initial}$ as the initial transmitting power for transmission to the second UE. The $P_{initial}$ is configured by the base station through the UE-specific RRC signaling of the Uu interface, or is a high-level pre-configuration parameter of the PC5 interface. The $P_{initial}$ may be associated with the configuration of the resource pool, that is, each resource pool is configured with a corresponding $P_{initial}$, which is used as the initial transmitting power of the unicast transmission on the resource pool (the transmitting power before the RSRP feedback is obtained). The $P_{initial}$ may also be associated with a priority of the PSSCH, that is, different PSSCH priorities are configured with different $P_{initial}$ values. The $P_{initial}$ may also be associated with a CRB measured on the resource pool, that is, different CRB sections correspond to different $P_{initial}$ values.

Alternatively, before the RSRP feedback of the second UE is obtained, the first UE uses a rated maximum transmitting power (that is, $P_{CMAX}$) as the initial transmitting power for transmission to the second UE. For example, $P_{CMAX}$=23 dBm.

Alternatively, before the RSRP feedback of the second UE is obtained, the first UE uses a pre-configured maximum transmitting power (that is, maxTxpower) as the initial transmitting power for transmission to the second UE. The maximum transmitting power is also used to limit the maximum transmitting power of the open loop power control. The maximum transmitting power is an optional configuration. If the maximum transmitting power is not configured, the first UE uses the rated maximum transmitting power $P_{CMAX}$ as the initial transmitting power for transmission to the second UE. The first UE jointly determines the value of the maximum transmitting power based on the CBR and the priority of the PSSCH measured on the resource pool where the PSSCH is located. Here, the CBR is a measured value on an nth time-slot before the time-slot in which the PSSCH is located, and n is a pre-defined value, for example, n=4.

Alternatively, before the RSRP feedback of the second UE is obtained by the first UE, if the first UE is in coverage of the cellular network, and the first UE is configured with an open loop power control based on a downlink pathloss, the initial transmitting power for transmission to the second UE by the first UE may be determined according to the open loop power control based on the downlink pathloss, that is, the open loop transmitting power is calculated based on the pathloss between the first UE and the base station.

Alternatively, when the first UE is configured with the open loop power control based on the sidelink pathloss, before the RSRP feedback of the second UE is obtained, the first UE calculates the initial transmitting power of the PSSCH by using the following formula $P_{Initial\_PSSCH}=\min\{P_{CMAX}, P_{MAX\_CBR}, 10\log_{10}\cdot M_{PSSCH}+P_{initial}\}$ if the maximum transmitting power (that is, maxTxpower) in high layer parameters is configured, otherwise $P_{Initial\_PSSCH}=\min\{P_{CMAX}, 10\log_{10}\cdot M_{PSSCH}+P_{initial}\}$.

Here, the $P_{initial}$ is the initial transmitting power on a pre-configured PRB, the first UE calculates the transmitting power by the $P_{initial}$ and the bandwidth occupied by the PSSCH, and compares the calculated transmitting power with the $P_{CMAX}$ and the $P_{MAX\_CBR}$, to select the minimum value as the initial transmitting power. The $P_{MAX\_CBR}$ is a value of the maximum transmitting power maxTxpower determined based on the CBR measured on the resource pool where the PSSCH is located and the priority of the PSSCH. Alternatively, when the first UE is configured with the open loop power control based on the sidelink pathloss, before the RSRP feedback of the second UE is obtained, the first UE calculates the initial transmitting power of the PSSCH and the PSCCH by using the following formula, $P_{Initial\_PSSCH}=\min\{P_{CMAX}, P_{MAX\_CBR}\}$ if the maximum transmitting power (that is, maxTxpower) in high layer parameters is configured, otherwise $P_{Initial\_PSSCH}=P_{CMAX}$. That is, the first UE uses the maximum transmitting power as the initial transmitting power by default, regardless of the bandwidth occupied by the PSSCH.

In the unicast transmission and/or the groupcast transmission, in order to improve the reliability of transmission, HARQ feedback is supported, that is, the RX UE may feed back ACK or NACK to the TX UE through the PSFCH. Similar to the PSCCH/PSSCH, the PSFCH should also perform the open loop power control based on the sidelink pathloss, in order to reduce the interference level on the resource pool.

Alternatively, when the unicast PSCCH/PSSCH is configured to apply the open loop power control based on the sidelink pathloss, the corresponding PSFCH for HARQ feedback should also perform the open loop power control based on the sidelink pathloss, and the TX UE calculates the pathloss between the TX UE and the RX UE through the RSRP fed back by the RX UE, and uses the calculated sidelink pathloss to calculate the transmitting power of the unicast PSCCH/PSSCH transmitted to the RX UE, that is, the TX UE may certainly acquire the pathloss information between the TX UE and the RX UE, then when the TX UE transmits the unicast data to the RX UE, the calculated pathloss between the TX UE and the RX UE may be informed to the RX UE, for example, transmitting the pathloss between the TX UE and the RX UE through the high layer signaling carried by the PSSCH. The RX UE uses the received sidelink pathloss to calculate the transmitting power of the corresponding PSFCH. That is, the RX UE measures the RSRP of the TX UE and feeds back the RSRP to the TX UE, and the TX UE calculates the pathloss between the TX UE and the RX UE based on the RSRP fed back by the RX UE and informs the pathloss to the RX UE.

Figure 6:
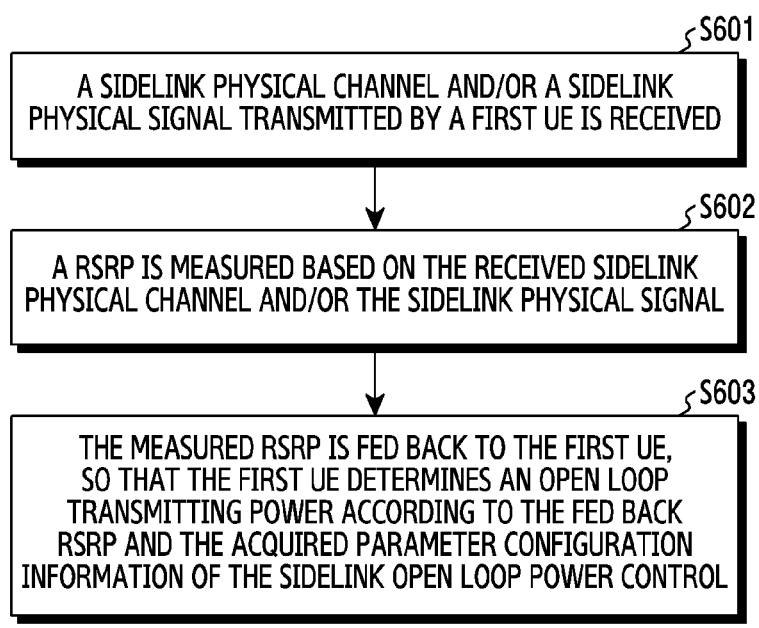
FIG. 6 illustrates a flowchart of a power control method, according to another exemplary embodiment of the present disclosure.

FIG. 6 illustrates a flowchart of a power control method, according to another exemplary embodiment of the present disclosure, wherein the power control method is performed by a second UE.

Referring to FIG. 6, in step S601, a sidelink physical channel and/or a sidelink physical signal transmitted by a first UE is received.

The sidelink physical channel may include at least one of the PSCCH, the PSSCH, and the PSFCH, and the PSCCH, the PSSCH, and the PSFCH may use the same or different parameter configuration information of the sidelink open loop power control. The parameter configuration information of the sidelink open loop power control has been described above in the description of FIG. 1, and details are not described herein again.

In step S602, an RSRP is measured based on the received sidelink physical channel and/or the sidelink physical signal.

Alternatively, the sidelink physical channel and/or the sidelink physical signal used for measuring RSRP by the second UE is a broadcast service transmitted by the first UE; or, the sidelink physical channel and/or the sidelink physical signal used for measuring RSRP by the second UE is a groupcast service transmitted by the first UE; or, the sidelink physical channel and/or the sidelink physical signal used for measuring RSRP by the second UE is a broadcast service and a groupcast service transmitted by the first UE, wherein the broadcast service and the groupcast service use the same transmitting power; or, the sidelink physical channel and/or the sidelink physical signal used for measuring RSRP by the second UE is a broadcast service, a groupcast service and/or a unicast service transmitted by the first UE, wherein a transmitting power of demodulation reference signal DMRS of the broadcast service, the groupcast service and/or the unicast service are the same.

In step S603, the measured RSRP is fed back to the first UE, so that the first UE determines an open loop transmitting power according to the fed back RSRP and the acquired parameter configuration information of the sidelink open loop power control.

Alternatively, if the power control method is used in the groupcast service, when feeding back the measured RSRP to the first UE, all second UEs may feed back the measured RSRP to the first UE, or, second UEs meeting pre-defined conditions or pre-configured conditions may feed back the measured RSRP to the first UE, so that the first UE calculates the open loop transmitting power based on the minimum value of all received RSRPs and the acquired parameter configuration information of the sidelink open loop power control.

Alternatively, if the measured RSRP is an L1-RSRP, when feeding back the measured RSRP to the first UE, the L1-RSRP is first transferred to high layer and an L3-RSRP is generated after performing layer 3 filtering; then the generated L3-RSRP is fed back to the first UE through a high layer signaling, so that the first UE calculates the open loop transmitting power based on the L3-RSRP. Or, if the measured RSRP is an L1-RSRP, when feeding back the measured RSRP to the first UE, the L1-RSRP is fed back to the first UE via a physical layer signaling, so that the first UE generates the L3-RSRP according to the L1-RSRP and calculates the open loop transmitting power based on the L3-RSRP, and/or, so that the first UE calculates the open loop transmitting power based on the L1-RSRP.

Alternatively, the second UE feeds back the measured RSRP to the first UE through a PC5 interface, that is, the second UE feeds back the RSRP of the first UE via a sidelink physical channel.

In one example, the second UE transmits the RSRP of the first UE through the PSFCH. The PSFCH includes at least one of an ID of the first UE (that is, a source ID of the TX UE) and an ID of the second UE (that is, a target ID of the RX UE), in addition to the indication information of the RSRP.

In another example, the second UE transmits the RSRP of the first UE via the high layer signaling carried by the PSSCH. Alternatively, the second UE transmits the RSRP of the first UE via the high layer signaling carried by the unicast PSSCH. Alternatively, the second UE transmits the RSRP of the first UE via the high layer signaling carried by the broadcast PSSCH, and the broadcast PSSCH also carries the RSRP to be transmitted to other UEs, and the indication information includes the ID of the UE corresponding to the RSRP (that is, the source ID of the TX UE) in addition to the RSRP, that is, the second UE multiplexes RSRPs of multiple UEs together and sends out them in the broadcast mode.

In yet another example, the second UE transmits the RSRP of the first UE by occupying a part of resource of the unicast PSSCH, that is, the RSRP of the first UE is fed back in a piggyback manner via the physical layer signaling, and the second UE uses a part of Resource Element (RE), which is originally used for PSSCH transmission, for transmitting the RSRP, and the processing of the PSSCH transmission for these REs occupied by the RSRP is based on a rate matching manner, that is, the PSSCH performs data symbolic rate matching and RE mapping on the remaining REs; or, the processing of the PSSCH transmission for these REs occupied by the RSRP is based on a puncturing manner, that is, the data symbols of the PSSCH originally mapped on the occupied REs are discarded.

Alternatively, the second UE feeds back the measured RSRP to the first UE through the Uu interface. For example, the second UE transmits the RSRP to the base station via the UE-specific RRC signaling of the Uu interface, and the base station then forwards the received RSRP to the first UE via the UE-specific RRC signaling of the Uu interface, that is, the fed back RSRP information is forwarded by the base station.

Alternatively, the measurement and feedback of the RSRP of the first UE by the second UE may be implicitly triggered, that is, there is no need to trigger by a dedicated signaling.

In one example, one resource pool is configured with the open loop power control based on the sidelink pathloss, that is, all TX UEs on the resource pool use the open loop power control based on the sidelink pathloss to limit the transmitting power, then the RX UE on this resource pool should perform the RSRP measurement and feedback on each TX UE on this resource pool. That is, the UE determines whether to measure and feed back the RSRP on the resource pool according to the configuration information of the resource pool, and there is no need to trigger the RSRP measurement and feedback of the UE by a dedicated signaling.

In another example, the unicast transmission is configured with the open loop power control based on the sidelink pathloss, and after receiving the first unicast transmission transmitted by the first UE, the second UE starts the RSRP measurement and feedback for the first UE, and there is no need to trigger by a dedicated signaling, which is an event trigger. Here, the event that triggers the RSRP measurement and feedback is that the second UE receives the unicast transmission of the first UE for the first time, that is, the unicast link between the first UE and the second UE is established for the first time.

Alternatively, the measurement and feedback of the RSRP of the first UE by the second UE may be explicitly triggered by a dedicated signaling.

In an example, the measurement and feedback of the RSRP of the first UE by the second UE is triggered by a dedicated signaling transmitted by the base station, and the dedicated signaling is carried by the UE-specific RRC signaling. For example, the base station reports, that the second UE is known to be the RX UE for the potential unicast service of the first UE, by the information of the first UE, and the base station may notify the second UE to measure and feed back the RSRP of the first UE via the UE-specific RRC signaling of the Uu interface.

In another example, the measurement and feedback of the RSRP of the first UE by the second UE is triggered by a dedicated signaling transmitted by the first UE, and the dedicated signaling is carried by the unicast PSCCH/PSSCH. For example, the RSRP fed back to the first UE by the second UE is an L3-RSRP, and the first UE notifies the second UE to feed back the L3-RSRP via a specific high-layer signaling, and triggers the feedback of the L3-RSRP by the unicast PSSCH. Correspondingly, the second UE feeds back the L3-RSRP of the first UE by the unicast PSSCH; or, the RSRP fed back to the first UE by the second UE is an L1-RSRP, and the first UE notifies the second UE to feed back the L1-RSRP via a specific physical layer signaling, that is, the feedback of the L1-RSRP is indicated in the sidelink control information (SCI). Correspondingly, the second UE feeds back the L1-RSRP by the physical layer signaling, that is, the L1-RSRP is fed back through the PSFCH.

In yet another example, the measurement and feedback of the RSRP of the first UE by the second UE is triggered by a dedicated signaling transmitted by the first UE, and the dedicated signaling is carried by the broadcast PSSCH. For example, the first UE notifies the second UE to feed back a RSRP via a specific high-layer signaling carried by the broadcast PSSCH. In addition, in the broadcast PSSCH, the first UE also notifies other UEs to feed back a RSRP as well, that is, the first UE indicates, by the high layer signaling (for example, RRC signaling), all the IDs of the UEs that need to measure and feed back the RSRP, that is, the target ID of the RX UE, and transmits the high layer signaling in the broadcast mode. Only the indicated UE performs RSRP measurement and feedback for the first UE, and the UEs that are not indicated do not need to perform the RSRP measurement and feedback for the first UE.

Once the second UE initiates the RSRP measurement and feedback for the first UE, the second UE should continuously measure the RSRP of the first UE until the data service transmission process transmitted by the first UE to the second UE is completed. During the data service transmission from the first UE to the second UE, the RSRP feedback to the first UE by the second UE may be triggered by the second UE, or may be triggered by the first UE.

In one example, after the second UE feeds back the measured RSRP to the first UE for the first time, and during the data service transmission from the first UE to the second UE, when a changed amount of the RSRP measured by the second UE exceeds a pre-defined threshold or a pre-configured threshold, the second UE should take the initiative to feed back the updated RSRP to the first UE, that is, the RSRP feedback is triggered by the second UE, so as to timely respond to the change of the pathloss between the first UE and the second UE, thereby ensuring a sidelink transmission reliability while maintaining a minimum transmitting power.

In another example, after the second UE feeds back the measured RSRP to the first UE for the first time, and during the data service transmission process that the first UE transmits to the second UE, the RSRP feedback of the first UE by the second UE is triggered by a dedicated signaling, for example, the first UE finds that the reliability of the sidelink transmission is getting worse according to the HARQ-ACK feedback from the second UE, that is, the pathloss between the first UE and the second UE may be deteriorated, then the first UE triggers the second UE to feed back a RSRP by a dedicated signaling, to update the open loop transmitting power.

The power control method according to the exemplary embodiments of the present disclosure has been described above with reference to FIG. 1 to FIG. 6. Hereinafter, a terminal for performing power control and modules thereof according to the exemplary embodiments of the present disclosure will be described with reference to FIG. 7 to FIG. 9.

Figure 7:
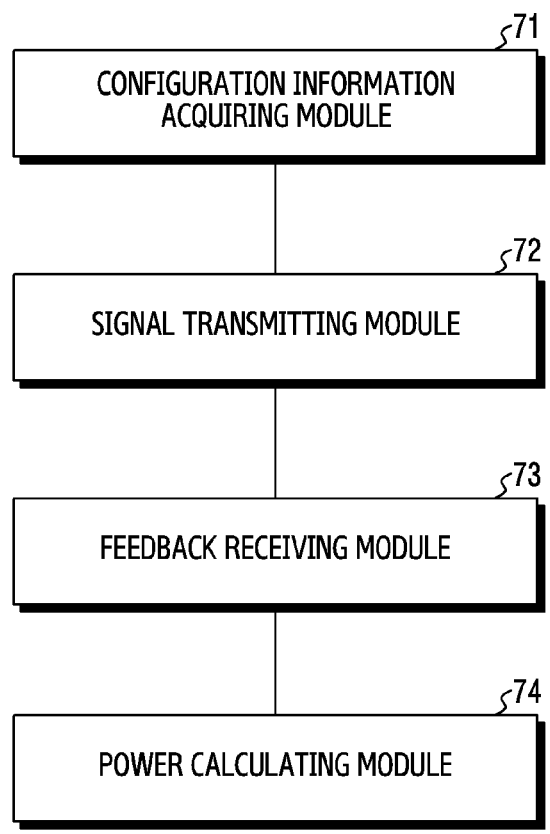
FIG. 7 illustrates a block diagram of a terminal for performing power control, according to one exemplary embodiment of the present disclosure.

FIG. 7 illustrates a block diagram of a terminal for performing power control, according to one exemplary embodiment of the present disclosure.

In the present embodiment, the terminal for performing power control is a first UE. Referring to FIG. 7, the terminal for performing power control includes a configuration information acquiring module 71, a signal transmitting module 72, a feedback receiving module 73, and a power calculating module 74.

The configuration information acquiring module 71 is configured to acquire parameter configuration information for sidelink open loop power control.

The signal transmitting module 72 is configured to transmit a sidelink physical channel and/or a sidelink physical signal to a second UE, so that the second UE measures the RSRP based on the received sidelink physical channel and/or the sidelink physical signal, and feeds back the measured RSRP to the first UE.

The feedback receiving module 73 is configured to receive the RSRP fed back by the second UE.

The power calculating module 74 is configured to calculate an open loop transmitting power based on the received RSRP and the acquired parameter configuration information of the sidelink open loop power control.

Alternatively, the sidelink physical channel includes at least one of the PSCCH, the PSSCH, and the PSFCH, wherein the PSCCH, the PSSCH, and the PSFCH share the same parameter configuration information of the sidelink open loop power control; or, the PSCCH and the PSSCH share the same parameter configuration information of the sidelink open loop power control, and the PSFCH is configured with parameter configuration information of the sidelink open loop power control separately from the PSCCH and the PSSCH; or, the PSCCH, the PSSCH, and the PSFCH are configured with parameter configuration information of the sidelink open loop power control separately from each other; or, the PSCCH and the PSFCH share the same parameter configuration information of the sidelink open loop power control, and the PSSCH is configured with parameter configuration information of the sidelink open loop power control separately from the PSCCH and the PSFCH.

Alternatively, the configuration information acquiring module 71 may be configured to receive the parameter configuration information of the sidelink open loop power control configured by a UE-specific Radio Resource Control (RRC) signaling transmitted by a base station, through a Uu interface between the first UE and the base station, and/or, to acquire the parameter configuration information of the sidelink open loop power control from the sidelink pre-configuration parameters of the first UE.

Alternatively, the parameter configuration information of the sidelink open loop power control is associated with a configuration of a resource pool, the acquired parameter configuration information of the sidelink open loop power control is parameter configuration information of the sidelink open loop power control corresponding to the resource pool, and/or, the parameter configuration information of the sidelink open loop power control is associated with a channel busy ratio on the resource pool, the acquired parameter configuration information of the sidelink open loop power control is parameter configuration information of the sidelink open loop power control corresponding to the channel busy ratio measured by the first UE on the resource pool, and/or, the first UE determines whether to perform power control according to the channel busy ratio measured on the resource pool of the first UE, even if the resource pool of the first UE is configured with the parameter configuration information of the sidelink open loop power control.

Alternatively, the feedback receiving module 73 may be configured to receive the RSRP fed back by the second UE through a PC5 interface, or, to receive the RSRP fed back by the second UE through a Uu interface.

Alternatively, the feedback receiving module may be further configured to receive the RSRP fed back by the second UE through the PSFCH, wherein the sidelink control information of the PSFCH includes at least one of an ID of the first UE and an ID of the second UE, or, to receive the RSRP fed back by the second UE through a unicast PSSCH and/or a broadcast PSSCH.

Alternatively, the sidelink physical channel and/or the sidelink physical signal, which is used for measuring RSRP by the second UE, is a broadcast service transmitted by the first UE, or, the sidelink physical channel and/or the sidelink physical signal, which is used for measuring RSRP by the second UE, is a groupcast service transmitted by the first UE, or, the sidelink physical channel and/or the sidelink physical signal, which is used for measuring RSRP by the second UE, is a broadcast service and a groupcast service transmitted by the first UE, wherein the broadcast service and the groupcast service use the same transmitting power, or, the sidelink physical channel and/or the sidelink physical signal, which is used for measuring RSRP by the second UE, is a broadcast service, a groupcast service and/or a unicast service transmitted by the first UE, wherein the transmitting power of demodulation reference signal DMRS of the broadcast service, the groupcast service and/or the unicast service are the same.

Alternatively, the feedback receiving module 73 may be configured to receive the RSRP fed back by all second UEs or to receive the RSRP fed back by second UEs meeting a pre-defined or pre-configured condition, when the power control method is used in groupcast service. The power calculating module 74 may be configured to calculate the open loop transmitting power based on the minimum value of all received RSRPs and the acquired parameter configuration information of the sidelink open loop power control.

Alternatively, the power calculating module 74 may be configured to calculate the open loop transmitting power based on the L3-RSRP and the acquired parameter configuration information of the sidelink open loop power control, when the RSRP fed back by the second UE is an L3-RSRP generated after performing layer 3 filtering on an L1-RSRP and fed back via a high layer signaling. Or, the power calculating module 74 may be configured to generate an L3-RSRP based on the fed back L1-RSRP and calculate the open loop transmitting power based on the L3-RSRP and the acquired parameter configuration information of the sidelink open loop power control, when the RSRP fed back by the second UE is an L1-RSRP fed back via a physical layer signaling. Or, the power calculating module 74 may be configured to calculate the open loop transmitting power based on the fed back L1-RSRP and the acquired parameter configuration information of the sidelink open loop power control, when the RSRP fed back by the second UE is an L1-RSRP fed back by a physical layer signaling.

Alternatively, the power calculating module 74 may be configured to calculate a sidelink pathloss between the first UE and the second UE based on the received RSRP and calculate the open loop transmitting power based on the calculated sidelink pathloss and the acquired parameter configuration information of the sidelink open loop power control.

Figure 8:
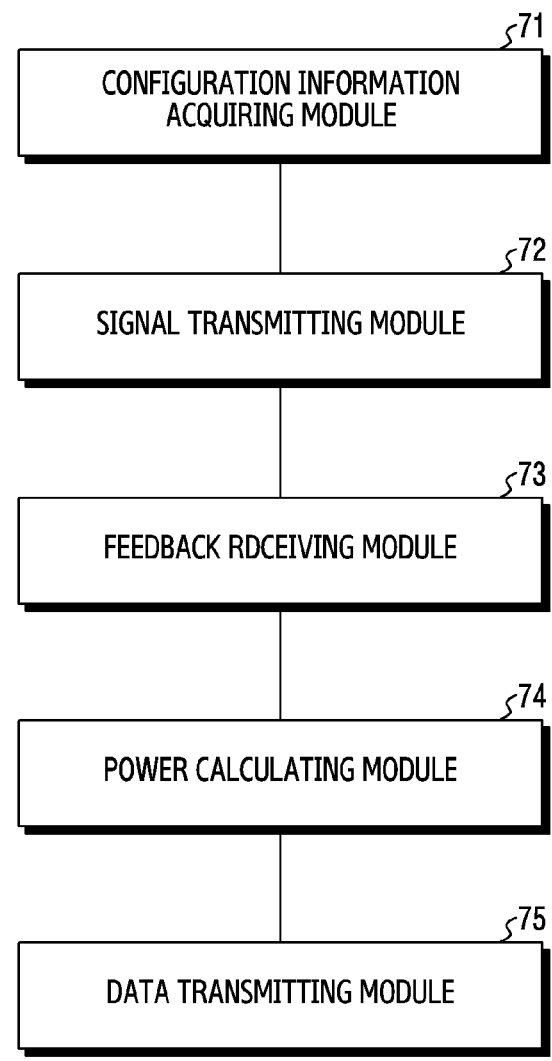
FIG. 8 illustrates a block diagram of a terminal for performing power control, according to another exemplary embodiment of the present disclosure.

Alternatively, as shown in FIG. 8, the terminal for performing power control may further include a data transmitting module 75 configured to transmit the PSCCH, the PSSCH, and/or the PSFCH to the second UE, based on the calculated open loop transmitting power.

Alternatively, the terminal for performing power control may further include a first transmitting module and when the calculated open loop transmitting power is inconsistent with an open loop transmitting power of a downlink pathloss configured in the open loop power control based on the downlink pathloss, the first transmitting model is configured to transmit the PSCCH, the PSSCH, and/or the PSFCH to the second UE based on the minimum one of the calculated open loop transmitting power and the open loop transmitting power of the downlink pathloss, or, to transmit the PSCCH, the PSSCH, and/or the PSFCH to the second UE based on the maximum one of the calculated open loop transmitting power and the open loop transmitting power of the downlink pathloss, or, to transmit the PSCCH, the PSSCH, and/or the PSFCH to the second UE based on one of the calculated open loop transmitting power and the open loop transmitting power of the downlink pathloss, which has a higher priority or, to transmit the PSCCH, the PSSCH, and/or the PSFCH to the second UE based on a weighted value of the calculated open loop transmitting power and the open loop transmitting power of the downlink pathloss, or, to transmit the PSCCH, the PSSCH, and/or the PSFCH to the second UE based on the open loop transmitting power of the downlink pathloss.

Alternatively, the terminal for performing power control may further include a second transmitting module configured to transmit the PSCCH, the PSSCH, and/or the PSFCH to the second UE using a pre-configured power, before the RSRP feedback of the second UE is obtained, or, to transmit the PSCCH, the PSSCH, and/or the PSFCH to the second UE using a rated maximum transmitting power, before the RSRP feedback of the second UE is obtained, or, to transmit the PSCCH, the PSSCH, and/or the PSFCH to the second UE using a pre-configured maximum transmitting power, before the RSRP feedback of the second UE is obtained, or, to transmit the PSCCH, the PSSCH, and/or the PSFCH to the second UE by using a power determined based on the open loop power control for the downlink pathloss, before the RSRP feedback of the second UE is obtained.

Figure 9:
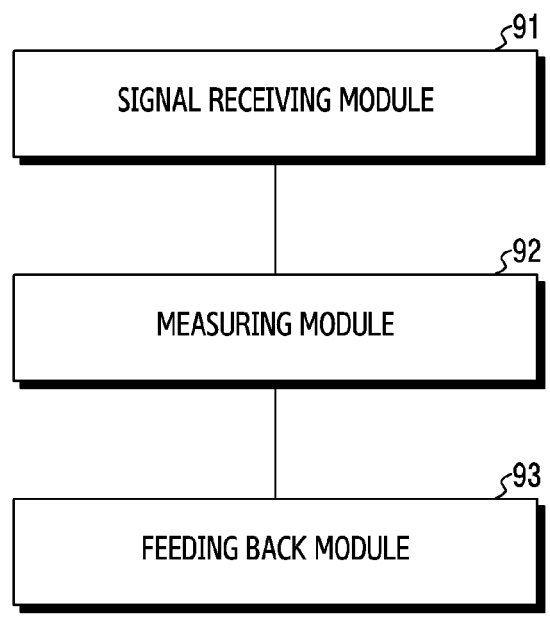
FIG. 9 illustrates a block diagram of a terminal for performing power control, according to another exemplary embodiment of the present disclosure.

FIG. 9 illustrates a block diagram of a terminal for performing power control, according to another exemplary embodiment of the present disclosure.

In the present embodiment, the terminal for performing power control is a second UE. Referring to FIG. 9, the terminal for performing power control includes a signal receiving module 91, a measuring module 92, and a feeding back module 93.

The signal receiving module 91 is configured to receive a sidelink physical channel and/or a sidelink physical signal transmitted by a first UE.

The measuring module 92 is configured to measure RSRP based on the received sidelink physical channel and/or the sidelink physical signal.

The feeding back module 93 is configured to feed back the measured RSRP to the first UE, so that the first UE determines an open loop transmitting power according to the fed back RSRP and the acquired parameter configuration information for sidelink open loop power control.

Alternatively, the feeding back module 93 may be configured to feed back the measured RSRP to the first UE through a PC5 interface, or, to feed back the measured RSRP to the first UE through a Uu interface. The feeding back module 93 may be further configured to feed back the measured RSRP to the first UE through a PSFCH, wherein the sidelink control information of the PSFCH includes at least one of an ID of the first UE and an ID of the second UE, or, to feed back the measured RSRP to the first UE through a unicast PSSCH and/or a broadcast PSSCH.

Alternatively, the sidelink physical channel and/or the sidelink physical signal, which is used for measuring the RSRP by the second UE, is a broadcast service transmitted by the first UE, or, the sidelink physical channel and/or the sidelink physical signal, which is used for measuring RSRP by the second UE, is a groupcast service transmitted by the first UE, or, the sidelink physical channel and/or the sidelink physical signal, which is used for measuring RSRP by the second UE, is a broadcast service and a groupcast service transmitted by the first UE, wherein the broadcast service and the groupcast service use the same transmitting power, or, the sidelink physical channel and/or the sidelink physical signal, which is used for measuring RSRP by the second UE, is a broadcast service, a groupcast service and/or a unicast service transmitted by the first UE, wherein a transmitting power of demodulation reference signal DMRS of the broadcast service, the groupcast service and/or the unicast service are same.

Alternatively, when the measured RSRP is an L1-RSRP, the feeding back module 93 may be configured to transfer the L1-RSRP to high layer and generate an L3-RSRP after performing layer 3 filtering, and feed back the generated L3-RSRP to the first UE through a high layer signaling, so that the first UE calculates the open loop transmitting power based on the L3-RSRP. Or, when the measured RSRP is an L1-RSRP, the feeding back module 93 may be configured to feed back the L1-RSRP to the first UE through a physical layer signaling, so that the first UE generates an L3-RSRP according to the L1-RSRP and calculates the open loop transmitting power based on the L3-RSRP, and/or, so that the first UE calculates the open loop transmitting power based on the L1-RSRP.

Alternatively, the terminal for performing power control may further include a feedback determining module configured to determine whether to measure and feed back the RSRP on the resource pool according to the parameter configuration information of the sidelink open loop power control corresponding to the resource pool, or, to trigger the second UE to measure and feed back the RSRP of the first UE by a dedicated signaling, wherein the dedicated signaling includes a dedicated signaling transmitted by the base station and/or a dedicated signaling transmitted by the first UE, or, to trigger the second UE to measure and feed back the RSRP of the first UE in a manner in which the first UE broadcasts the PSSCH notification.

Alternatively, when the power control method is used in the groupcast service, the feeding back module 93 may be configured to feed back the measured RSRP to the first UE in all conditions, or, to feed back the measured RSRP to the first UE when meets a pre-defined or pre-configured condition, so that the first UE calculates the open loop transmitting power based on the minimum value of all received RSRPs and the acquired parameter configuration information of the sidelink open loop power control.

In addition, according to the exemplary embodiments of the present disclosure, there is further provided a computer readable storage medium stored with a computer program, when the computer program is being executed, the power control methods according to the present disclosure are implemented.

Alternatively, when the computer program is being executed in a first UE, the follow steps may be implemented: acquiring parameter configuration information for sidelink open loop power control; transmitting a sidelink physical channel and/or a sidelink physical signal to a second UE, so that the second UE measures the RSRP based on the received sidelink physical channel and/or the sidelink physical signal, and feeds back the measured RSRP to the first UE; receiving the RSRP fed back by the second UE; calculating an open loop transmitting power based on the received RSRP and the acquired parameter configuration information of the sidelink open loop power control.

Alternatively, when the computer program is being executed in a first UE, the follow steps may be implemented: acquiring parameter configuration information for sidelink open loop power control; transmitting a sidelink physical channel and/or a sidelink physical signal to a second UE, so that the second UE measures the RSRP based on the received sidelink physical channel and/or the sidelink physical signal, and feeds back the measured RSRP to the first UE; receiving the RSRP fed back by the second UE; calculating an open loop transmitting power based on the received RSRP and the acquired parameter configuration information of the sidelink open loop power control; transmitting a PSCCH, a PSSCH, and/or a PSFCH to the second UE, based on the calculated open loop transmitting power.

Alternatively, when the computer program is being executed in a second UE, the follow steps may be implemented: receiving a sidelink physical channel and/or a sidelink physical signal transmitted by a first UE; measuring an RSRP based on the received sidelink physical channel and/or the sidelink physical signal; feeding back the measured RSRP to the first UE, so that the first UE determines an open loop transmitting power according to the fed back RSRP and the acquired parameter configuration information of the sidelink open loop power control.

The terminal for performing power control according to the exemplary embodiments of the present disclosure has been described above with reference to FIG. 7 to FIG. 9. Hereinafter, a terminal according to the exemplary embodiments of the present disclosure will be described with reference to FIG. 10.

Figure 10:
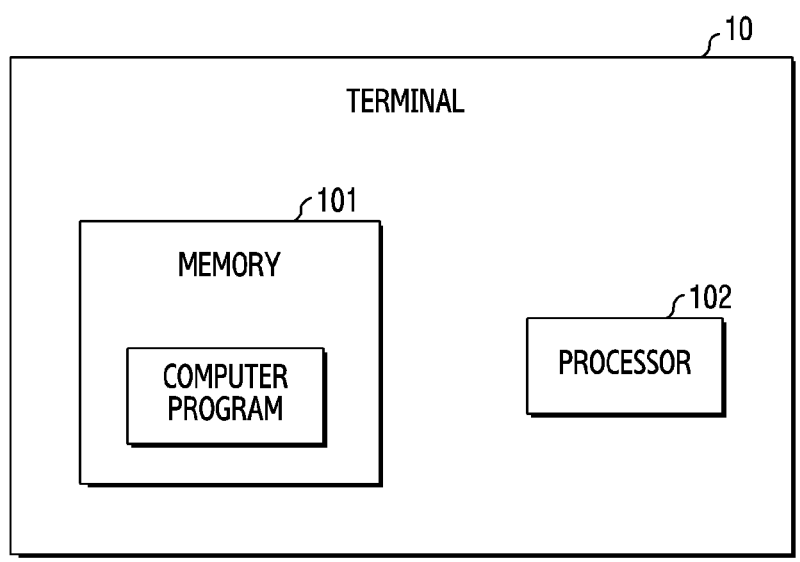
FIG. 10 illustrates a block diagram of a terminal, according to an exemplary embodiment of the present disclosure.

FIG. 10 illustrates a block diagram of a terminal, according to an exemplary embodiment of the present disclosure.

Referring to FIG. 10, the terminal 10 according to an exemplary embodiment of the present disclosure includes a memory 101, a processor 102, and a computer program which is stored on the memory 101 and operable on the processor 102, and when the computer program is being executed by the processor 102, the power control method according to the present disclosure is implemented.

As an example, the processor 102 may be configured to execute a program including following steps of the power control method: acquiring parameter configuration information for sidelink open loop power control; transmitting a sidelink physical channel and/or a sidelink physical signal to a second UE, so that the second UE measures the RSRP based on the received sidelink physical channel and/or the sidelink physical signal, and feeds back the measured RSRP to the first UE; receiving the RSRP fed back by the second UE; calculating an open loop transmitting power based on the received RSRP and the acquired parameter configuration information of the sidelink open loop power control.

As an example, the processor 102 may be configured to execute a program including following steps of the power control method: acquiring parameter configuration information for sidelink open loop power control; transmitting a sidelink physical channel and/or a sidelink physical signal to a second UE, so that the second UE measures the RSRP based on the received sidelink physical channel and/or the sidelink physical signal, and feeds back the measured RSRP to the first UE; receiving the RSRP fed back by the second UE; calculating an open loop transmitting power based on the received RSRP and the acquired parameter configuration information of the sidelink open loop power control; transmitting a PSCCH, a PSSCH, and/or a PSFCH to the second UE, based on the calculated open loop transmitting power.

As an example, the processor 102 may be configured to execute a program including following steps of the power control method: receiving a sidelink physical channel and/or a sidelink physical signal transmitted by a first UE; measuring a RSRP based on the received sidelink physical channel and/or the sidelink physical signal; feeding back the measured RSRP to the first UE, so that the first UE determines an open loop transmitting power according to the fed back RSRP and the acquired parameter configuration information of the sidelink open loop power control.

The power control methods and terminals for performing power control according to an exemplary embodiment of the present disclosure have been described above with reference to FIGS. 1-10. However, it should be understood that the terminals for performing power control and modules therein shown in FIGS. 7-9 may be respectively configured to execute software, hardware, firmware, or any combination of them of a specific function. The terminal as shown in FIG. 10 is not limited to including the components shown above, but some components may be added or deleted as needed, and the above components may also be combined.

The power control methods and the terminals for performing power control according to the exemplary embodiment of the present disclosure, may acquire the parameter configuration information of the sidelink open loop power control, transmit a sidelink physical channel and/or a sidelink physical signal to a second UE, so that the second UE measures the RSRP based on the received sidelink physical channel and/or the sidelink physical signal, and feeds back the measured RSRP to the first UE, receive the RSRP fed back by the second UE, calculate an open loop transmitting power based on the received RSRP and the acquired parameter configuration information of the sidelink open loop power control, and thus may transmit the PSCCH, the PSSCH, and/or the PSFCH to the second UE based on the calculated open loop transmitting power.

Figure 11:
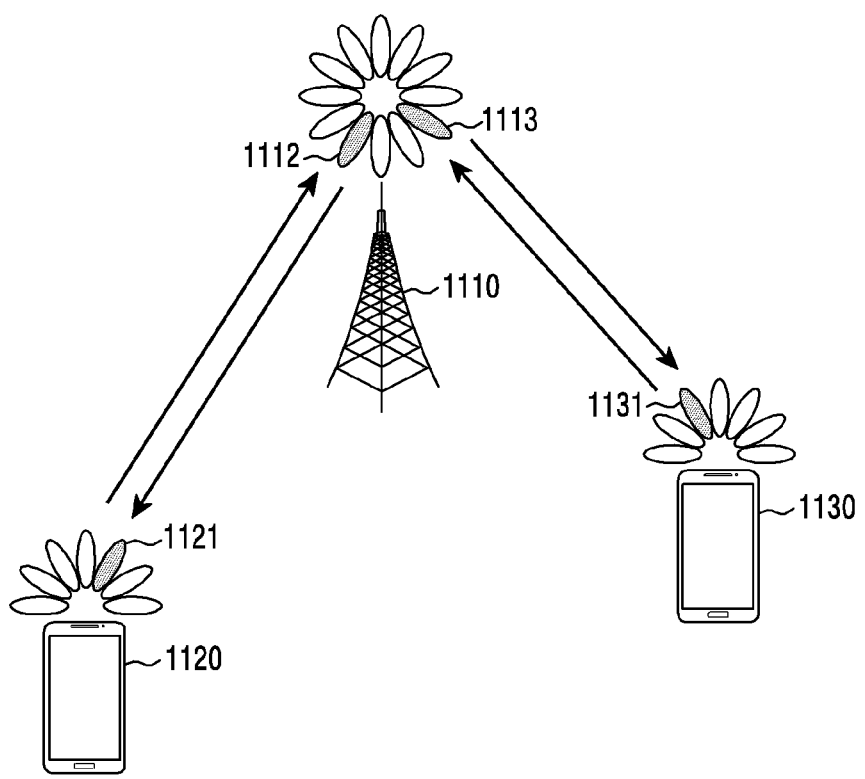
FIG. 11 illustrates a wireless communication system according to various embodiments of the present disclosure.

FIG. 11 illustrates a wireless communication system according to various embodiments of the present disclosure. In FIG. 11, a base station (BS) 1110, a terminal 1120, and a terminal 1130 are illustrated as the part of nodes using a wireless channel in a wireless communication system. FIG. 11 illustrates only one BS, but another BS, which is the same as or similar to the BS 1110, may be further included.

The BS 1110 is network infrastructure that provides wireless access to the terminals 1120 and 1130. The BS 1110 has coverage defined as a predetermined geographical region based on the distance at which a signal can be transmitted. The BS 1110 may be referred to as "access point (AP)," "eNodeB (eNB)," "5th generation (5G) node," "wireless point," "transmission/reception Point (TRP)" as well as "base station."

Each of the terminals 1120 and 1130 is a device used by a user, and performs communication with the BS 1110 through a wireless channel Depending on the case, at least one of the terminals 1120 and 1130 may operate without user involvement. That is, at least one of the terminals 1120 and 1130 is a device that performs machine-type communication (MTC) and may not be carried by the user. Each of the terminals 1120 and 1130 may be referred to as "user equipment (UE)," "mobile station," "subscriber station," "remote terminal," "wireless terminal," or "user device" as well as "terminal"

The BS 1110, the terminal 1120, and the terminal 1130 may transmit and receive wireless signals in millimeter wave (mmWave) bands (for example, 28 GHz, 30 GHz, 38 GHz, and 60 GHz). At this time, in order to improve a channel gain, the BS 110, the terminal 1120, and the terminal 1130 may perform beamforming. The beamforming may include transmission beamforming and reception beamforming. That is, the BS 1110, the terminal 1120, and the terminal 130 may assign directivity to a transmission signal and a reception signal. To this end, the BS 1110 and the terminals 1120 and 1130 may select serving beams 1112, 1113, 1121, and 1131 through a beam search procedure or a beam management procedure. After that, communications may be performed using resources having a quasi co-located relationship with resources carrying the serving beams 1112, 1113, 1121, and 1131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 12:
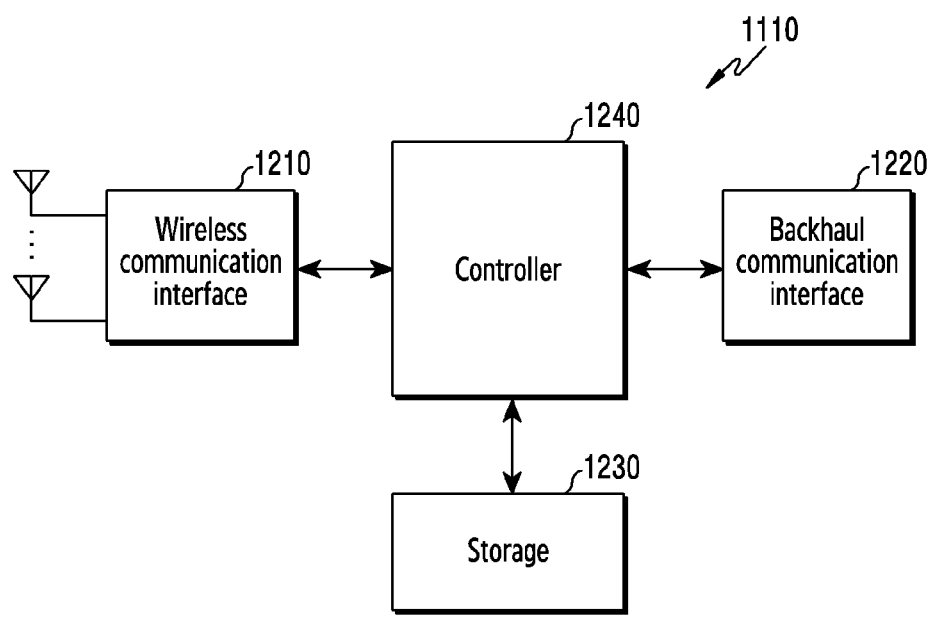
FIG. 12 illustrates the BS in the wireless communication system according to various embodiments of the present disclosure.

FIG. 12 illustrates the BS in the wireless communication system according to various embodiments of the present disclosure. A structure exemplified at FIG. 12 may be understood as a structure of the BS 1110. The term "-module", "-unit" or "-er" used hereinafter may refer to the unit for processing at least one function or operation and may be implemented in hardware, software, or a combination of hardware and software.

Referring to FIG. 12, the BS may include a wireless communication interface 1210, a backhaul communication interface 1220, a storage unit 1230, and a controller 1240.

The wireless communication interface 1210 performs functions for transmitting and receiving signals through a wireless channel. For example, the wireless communication interface 1210 may perform a function of conversion between a baseband signal and bitstreams according to a physical layer standard of the system. For example, in data transmission, the wireless communication interface 1210 generates complex symbols by encoding and modulating transmission bitstreams. Further, in data reception, the wireless communication interface 1210 reconstructs reception bitstreams by demodulating and decoding the baseband signal.

In addition, the wireless communication interface 1210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 1210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 1210 transmits and receives the signal as described above. Accordingly, the wireless communication interface 1210 may be referred to as a "transmitter" a "receiver," or a "transceiver." Further, in the following description, transmission and reception performed through the wireless channel may be used to have a meaning including the processing performed by the wireless communication interface 1210 as described above.

The backhaul communication interface 1220 provides an interface for performing communication with other nodes within the network. That is, the backhaul communication interface 1220 converts bitstreams transmitted to another node, for example, another access node, another BS, a higher node, or a core network, from the BS into a physical signal and converts the physical signal received from the other node into the bitstreams.

The storage unit 1230 stores a basic program, an application, and data such as setting information for the operation of the BS 1110. The storage unit 1230 may include a volatile memory, a non-volatile memory, or a combination of volatile memory and non-volatile memory. Further, the storage unit 1230 provides stored data in response to a request from the controller 1240.

The controller 1240 controls the general operation of the BS. For example, the controller 1240 transmits and receives a signal through the wireless communication interface 1210 or the backhaul communication interface 1220. Further, the controller 1240 records data in the storage unit 1230 and reads the recorded data. The controller 1240 may performs functions of a protocol stack that is required from a communication standard. According to another implementation, the protocol stack may be included in the wireless communication interface 1210. To this end, the controller 1240 may include at least one processor. According to various embodiments, the controller 1240 may include transceiver, processor.

According to exemplary embodiments of the present disclosure, the controller 1240 may. For example, the controller 1240 may control the base station to perform operations according to the exemplary embodiments of the present disclosure.

Figure 13:
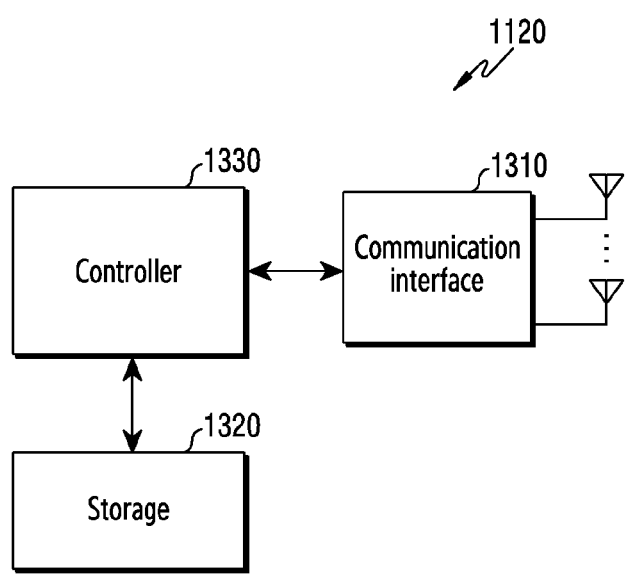
FIG. 13 illustrates the terminal in the wireless communication system according to various embodiments of the present disclosure.

FIG. 13 illustrates the terminal in the wireless communication system according to various embodiments of the present disclosure. A structure exemplified at FIG. 3 may be understood as a structure of the terminal 1120 or the terminal 1130. The term "-module", "-unit" or "-er" used hereinafter may refer to the unit for processing at least one function or operation, and may be implemented in hardware, software, or a combination of hardware and software.

Referring to FIG. 13, the terminal 1120 includes a communication interface 1310, a storage unit 1320, and a controller 1330.

The communication interface 1310 performs functions for transmitting/receiving a signal through a wireless channel. For example, the communication interface 1310 performs a function of conversion between a baseband signal and bitstreams according to the physical layer standard of the system. For example, in data transmission, the communication interface 1310 generates complex symbols by encoding and modulating transmission bitstreams. Also, in data reception, the communication interface 1310 reconstructs reception bitstreams by demodulating and decoding the baseband signal. In addition, the communication interface 1310 up-converts the baseband signal into an RF band signal, transmits the converted signal through an antenna, and then down-converts the RF band signal received through the antenna into the baseband signal. For example, the communication interface 1310 may include a transmission filter, a reception filter, an amplifier, a mixer, an oscillator, a DAC, and an ADC.

Further, the communication interface 1310 may include a plurality of transmission/reception paths. In addition, the communication interface 1310 may include at least one antenna array consisting of a plurality of antenna elements. In the hardware side, the wireless communication interface 1210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 1310 may include a plurality of RF chains. The communication interface 1310 may perform beamforming.

The communication interface 1310 transmits and receives the signal as described above. Accordingly, the communication interface 1310 may be referred to as a "transmitter," a "receiver," or a "transceiver." Further, in the following description, transmission and reception performed through the wireless channel is used to have a meaning including the processing performed by the communication interface 310 as described above.

The storage unit 1320 stores a basic program, an application, and data such as setting information for the operation of the terminal 1120. The storage unit 1320 may include a volatile memory, a non-volatile memory, or a combination of volatile memory and non-volatile memory. Further, the storage unit 1320 provides stored data in response to a request from the controller 1330.

The controller 1330 controls the general operation of the terminal 1120. For example, the controller 1330 transmits and receives a signal through the communication interface 1310. Further, the controller 1330 records data in the storage unit 1320 and reads the recorded data. The controller 1330 may performs functions of a protocol stack that is required from a communication standard. According to another implementation, the protocol stack may be included in the communication interface 1310. To this end, the controller 1330 may include at least one processor or microprocessor, or may play the part of the processor. Further, the part of the communication interface 1310 or the controller 1330 may be referred to as a communication processor (CP). According to various embodiments, the controller 1330 may include transceiver, processor.

According to exemplary embodiments of the present disclosure, the controller 1330 may perform power control and calculate power for transmitting. For example, the controller 1330 may control the terminal to perform operations according to the exemplary embodiments of the present disclosure.

Figure 14:
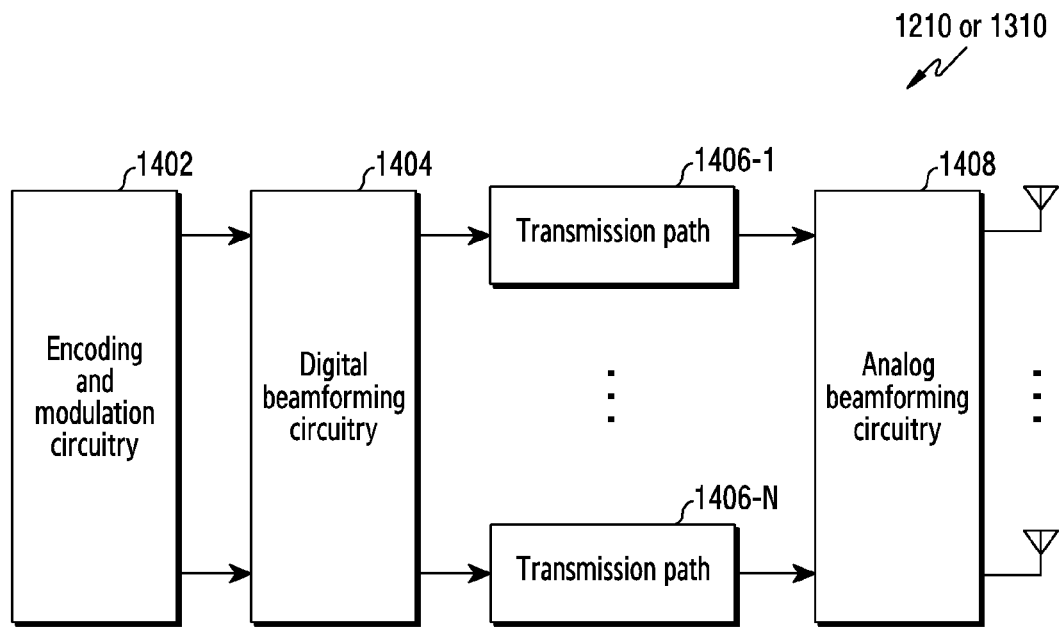
FIG. 14 illustrates the communication interface in the wireless communication system according to various embodiments of the present disclosure.

FIG. 14 illustrates the communication interface in the wireless communication system according to various embodiments of the present disclosure. FIG. 14 shows an example for the detailed configuration of the communication interface 1210 of FIG. 12 or the communication interface 1310 of FIG. 13. More specifically, FIG. 14 shows elements for performing beamforming as part of the communication interface 1210 of FIG. 12 or the communication interface 1310 of FIG. 13.

Referring to FIG. 14, the communication interface 1210 or 1310 includes an encoding and circuitry 1402, a digital circuitry 1404, a plurality of transmission paths 1406-1 to 1406-N, and an analog circuitry 408.

The encoding and circuitry 1402 performs channel encoding. For the channel encoding, at least one of a low-density parity check (LDPC) code, a convolution code, and a polar code may be used. The encoding and circuitry 1402 generates modulation symbols by performing constellation mapping.

The digital circuitry 1404 performs beamforming for a digital signal (for example, modulation symbols). To this end, the digital circuitry 1404 multiples the modulation symbols by beamforming weighted values. The beamforming weighted values may be used for changing the size and phrase of the signal, and may be referred to as a "precoding matrix" or a "precoder." The digital circuitry 1404 outputs the digitally beamformed modulation symbols to the plurality of transmission paths 1406-1 to 1406-N. At this time, according to a multiple input multiple output (MIMO) transmission scheme, the modulation symbols may be multiplexed, or the same modulation symbols may be provided to the plurality of transmission paths 1406-1 to 1406-N.

The plurality of transmission paths 1406-1 to 1406-N convert the digitally beamformed digital signals into analog signals. To this end, each of the plurality of transmission paths 1406-1 to 1406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 1406-1 to 1406-N provide independent signal processing processes for a plurality of streams generated through the digital beamforming. However, depending on the implementation, some of the elements of the plurality of transmission paths 1406-1 to 1406-N may be used in common.

The analog circuitry 1408 performs beamforming for analog signals. To this end, the digital circuitry 1404 multiples the analog signals by beamforming weighted values. The beamformed weighted values are used for changing the size and phrase of the signal. More specifically, according to a connection structure between the plurality of transmission paths 1406-1 to 1406-N and antennas, the analog circuitry 1408 may be configured in various ways. For example, each of the plurality of transmission paths 1406-1 to 1406-N may be connected to one antenna array. In another example, the plurality of transmission paths 1406-1 to 1406-N may be connected to one antenna array. In still another example, the plurality of transmission paths 1406-1 to 1406-N may be adaptively connected to one antenna array, or may be connected to two or more antenna arrays.

According to various embodiments, a power control method performed by a first User Equipment, UE, wherein the power control method comprises, acquiring parameter configuration information for side link open loop power control, transmitting a side link physical channel and/or a side link physical signal to a second UE, so that the second UE measures a Reference Signal Received Power (RSRP) based on the received side link physical channel and/or the side link physical signal, and feeds back the measured RSRP to the first UE, receiving the RSRP fed back by the second UE, calculating an open loop transmitting power based on the received RSRP and the acquired parameter configuration information for side link open loop power control.

According to various embodiment, the power control method further comprising, transmitting a Physical Side link Control Channel (PSCCH), a Physical Side link Shared Channel (PSSCH), and/or a Physical Side link feedback channel (PSFCH) to the second UE, based on the calculated open loop transmitting power.

According to various embodiment, the power control method, the side link physical channel comprises at least one of a Physical Side link Control Channel (PSCCH), a Physical Side link Shared Channel (PSSCH), and a Physical Sidelink Feedback Channel (PSFCH), the PSCCH, the PSSCH, and the PSFCH share the same parameter configuration information for side link open loop power control or the PSCCH and the PSSCH share the same parameter configuration information for side link open loop power control, and the PSFCH is configured with parameter configuration information for side link open loop power control separately from the PSCCH and the PSSCH or the PSCCH, the PSSCH, and the PSFCH are configured with parameter configuration information for side link open loop power control separately from each other or the PSCCH and the PSFCH share the same parameter configuration information for side link open loop power control, and the PSSCH is configured with parameter configuration information for side link open loop power control separately from the PSCCH and the PSFCH.

According to various embodiment, The power control method, the acquiring parameter configuration information for side link open loop power control comprises, receiving the parameter configuration information for side link open loop power control configured by a UE-specific Radio Resource Control (RRC) signaling transmitted by a base station, through a Uu interface between the first UE and the base station, and/or, acquiring the parameter configuration information for side link open loop power control from side link pre-configuration parameters of the first UE.

According to various embodiment, the power control method, the parameter configuration information for side link open loop power control is associated with a configuration of a resource pool, and the acquired parameter configuration information for side link open loop power control is parameter configuration information for side link open loop power control corresponding to the resource pool, and/or, the parameter configuration information for side link open loop power control is associated with a channel busy ratio measured on the resource pool, and the acquired parameter configuration information for side link open loop power control is parameter configuration information for side link open loop power control corresponding to the channel busy ratio measured by the first UE on the resource pool, and/or, the first UE determines whether to perform power control according to the channel busy ratio measured on the resource pool of the first UE, even if the resource pool of the first UE is configured with the parameter configuration information for side link open loop power control.

According to various embodiment, the power control method is receiving the RSRP fed back by the second UE comprises, receiving the RSRP fed back by the second UE through a PC5 interface or receiving the RSRP fed back by the second UE through a Uu interface, wherein receiving the RSRP fed back by the second UE through a PC5 interface comprises, receiving the RSRP fed back by the second UE through the PSFCH, wherein the side link control information of the PSFCH comprises at least one of an ID of the first UE and an ID of the second UE, or, receiving the RSRP fed back by the second UE through a unicast PSSCH and/or a broadcast PSSCH.

According to various embodiment, the power control method, wherein, the side link physical channel and/or the side link physical signal, which is used for measuring RSRP by the second UE, is a broadcast service transmitted by the first UE, or, the side link physical channel and/or the side link physical signal, which is used for measuring RSRP by the second UE, is a groupcast service transmitted by the first UE, or, the side link physical channel and/or the side link physical signal, which is used for measuring RSRP by the second UE, is a broadcast service and a groupcast service transmitted by the first UE, wherein the broadcast service and the groupcast service use the same transmitting power, or, the side link physical channel and/or the side link physical signal, which is used for measuring RSRP by the second UE, is a broadcast service, a groupcast service and/or a unicast service transmitted by the first UE, wherein a transmitting power of demodulation reference signal DMRS of the broadcast service, the groupcast service and/or the unicast service are the same.

According to various embodiment, the power control method, when the power control method is used in groupcast service, receiving the RSRP fed back by the second UE comprises, receiving the RSRP fed back by all second UEs or receiving the RSRP fed back by second UEs meeting a pre-defined or pre-configured condition, and, calculating an open loop transmitting power based on the received RSRP and the acquired parameter configuration information for side link open loop power control comprise calculating the open loop transmitting power based on a minimum value of all received RSRPs and the acquired parameter configuration information for side link open loop power control.

According to various embodiment, the power control method, when the RSRP fed back by the second UE is an L3-RSRP which is generated after performing layer 3 filtering on an L1-RSRP and fed back via a high layer signaling, calculating an open loop transmitting power based on the received RSRP and the acquired parameter configuration information for side link open loop power control comprises calculating the open loop transmitting power based on the L3-RSRP and the acquired parameter configuration information for side link open loop power control, or, when the RSRP fed back by the second UE is an L1-RSRP fed back via a physical layer signaling, calculating an open loop transmitting power based on the received RSRP and the acquired parameter configuration information for sidelink open loop power control comprises generating an L3-RSRP based on the fed back L1-RSRP, calculating the open loop transmitting power based on the L3-RSRP and the acquired parameter configuration information for sidelink open loop power control, or, when the RSRP fed back by the second UE is an L1-RSRP fed back by a physical layer signaling, calculating an open loop transmitting power based on the received RSRP and the acquired parameter configuration information for sidelink open loop power control comprises, calculating the open loop transmitting power based on the fed back L1-RSRP and the acquired parameter configuration information for sidelink open loop power control.

According to various embodiment, the power control method, the calculating an open loop transmitting power based on the received RSRP and the acquired parameter configuration information for sidelink open loop power control comprises, calculating an sidelink pathloss between the first UE and the second UE based on the received RSRP, calculating the open loop transmitting power based on the calculated sidelink pathloss and the acquired parameter configuration information for sidelink open loop power control.

According to various embodiment, The power control method further comprising, when both power control based on the sidelink pathloss and power control based on a downlink pathloss are enabled, and the calculated open loop transmitting power is inconsistent with an open loop transmitting power of the downlink pathloss, transmitting the PSCCH, the PSSCH, and/or the PSFCH to the second UE based on a minimum one of the calculated open loop transmitting power and the open loop transmitting power of the downlink pathloss, or, transmitting the PSCCH, the PSSCH, and/or the PSFCH to the second UE based on a maximum one of the calculated open loop transmitting power and the open loop transmitting power of the downlink pathloss, or, transmitting the PSCCH, the PSSCH, and/or the PSFCH to the second UE based on one having a higher priority of the calculated open loop transmitting power and the open loop transmitting power of the downlink pathloss, or, transmitting the PSCCH, the PSSCH, and/or the PSFCH to the second UE based on a weighted value of the calculated open loop transmitting power and the open loop transmitting power of the downlink pathloss, or, transmitting the PSCCH, the PSSCH, and/or the PSFCH to the second UE based on the open loop transmitting power of the downlink pathloss.

According to various embodiment, the power control method further comprise transmitting the PSCCH, the PSSCH, and/or the PSFCH to the second UE by using a pre-configured power, before the RSRP feedback of the second UE is acquired, or, transmitting the PSCCH, the PSSCH, and/or the PSFCH to the second UE by using a rated maximum transmitting power, before the RSRP feedback of the second UE is acquired, or transmitting the PSCCH, the PSSCH, and/or the PSFCH to the second UE by using a pre-configured maximum transmitting power, before the RSRP feedback of the second UE is acquired, or, transmitting the PSCCH, the PSSCH, and/or the PSFCH to the second UE by using a power determined based on the downlink pathloss for the open loop power control, before the RSRP feedback of the second UE is acquired.

According to various embodiment, a power control method performed by a second UE, wherein the power control method comprise receiving a side link physical channel and/or a sidelink physical signal transmitted by a first UE, measuring an RSRP based on the received sidelink physical channel and/or the sidelink physical signal, feeding back the measured RSRP to the first UE, so that the first UE determines an open loop transmitting power according to the fed back RSRP and the acquired parameter configuration information for sidelink open loop power control.

According to various embodiment, The power control method, the feeding back the measured RSRP to the first UE comprises feeding back the measured RSRP to the first UE through a PC5 interface, or, feeding back the measured RSRP to the first UE through an Uu interface, wherein feeding back the measured RSRP to the first UE through a PC5 interface comprise feeding back the measured RSRP to the first UE through a PSFCH, and the sidelink control information of the PSFCH comprises at least one of an ID of the first UE and an ID of the second UE, or, feeding back the measured RSRP to the first UE through a unicast PSSCH and/or a broadcast PSSCH.

According to various embodiment, The power control method, the sidelink physical channel and/or the sidelink physical signal, which is used for measuring RSRP by the second UE, is a broadcast service transmitted by the first UE, or, the sidelink physical channel and/or the sidelink physical signal, which is used for measuring RSRP by the second UE, is a groupcast service transmitted by the first UE, or, the sidelink physical channel and/or the sidelink physical signal, which is used for measuring RSRP by the second UE, is a broadcast service and a groupcast service transmitted by the first UE, wherein the broadcast service and the groupcast service use the same transmitting power, or, the sidelink physical channel and/or the sidelink physical signal, which is used for measuring RSRP by the second UE, is a broadcast service, a groupcast service and/or a unicast service transmitted by the first UE, wherein a transmitting power of demodulation reference signal DMRS of the broadcast service, the groupcast service and/or the unicast service are the same.

According to various embodiment, the power control method, when the measured RSRP is an L1-RSRP, feeding back the measured RSRP to the first UE comprise transferring the L1-RSRP to high layer and generating an L3-RSRP after performing layer 3 filtering, feeding back the generated L3-RSRP to the first UE through a high layer signaling, so that the first UE calculates the open loop transmitting power based on the L3-RSRP, or, when the measured RSRP is an L1-RSRP, feeding back the measured RSRP to the first UE comprise feeding back the L1-RSRP to the first UE through a physical layer signaling, so that the first UE generates an L3-RSRP according to the L1-RSRP and calculates the open loop transmitting power based on the L3-RSRP, and/or, so that the first UE calculates the open loop transmitting power based on the L1-RSRP.

According to various embodiment, the power control method further comprise determining whether to measure and feed back the RSRP on the resource pool according to the parameter configuration information of the side open loop power control corresponding to the resource pool, or, triggering the second UE to measure and feed back the RSRP of the first UE via a dedicated signaling, wherein the dedicated signaling comprises a dedicated signaling transmitted by the base station and/or a dedicated signaling transmitted by the first UE, or, triggering the second UE to measure and feed back the RSRP of the first UE in a manner in which the first UE broadcasts the PSSCH notification.

According to various embodiment, the power control method, when the power control method is used in the groupcast service, feeding back the measured RSRP to the first UE comprise feeding back the measured RSRP to the first UE in all conditions, or, feeding back the measured RSRP to the first UE when meeting a pre-defined or pre-configured condition, so that the first UE calculates the open loop transmitting power based on a minimum value of all received RSRPs and the acquired parameter configuration information for sidelink open loop power control.

According to various embodiment, a terminal for performing power control, comprise a configuration information acquiring module, configured to acquire parameter configuration information for sidelink open loop power control, a signal transmitting module, configured to transmit a sidelink physical channel and/or a sidelink physical signal to a second UE, so that the second UE measures the Reference Signal Received Power (RSRP) based on the received sidelink physical channel and/or the sidelink physical signal, and feeds back the measured RSRP to the first UE, a feedback receiving module, configured to receive the RSRP fed back by the second UE; and a power calculating module, configured to calculate an open loop transmitting power based on the received RSRP and the acquired parameter configuration information for sidelink open loop power control.

According to various embodiment, the terminal for performing power control comprise a signal receiving module, configured to receive a sidelink physical channel and/or a sidelink physical signal transmitted by a first UE, a measuring module, configured to measure RSRP based on the received sidelink physical channel and/or the sidelink physical signal; and a feeding back module, configured to feed back the measured RSRP to the first UE, so that the first UE determines an open loop transmitting power according to the fed back RSRP and the acquired parameter configuration information for sidelink open loop power control.

Those skilled in the art will understand that the present disclosure includes apparatus related to performing one or more of the operations described herein. These apparatus may be specially designed and manufactured for the required purposes, or may also include known apparatus in a general purpose computer. These apparatus have computer programs stored therein, and are selectively activated or reconfigured. Such computer programs may be stored in the readable medium of an apparatus (for example, a computer) or in any type of mediums suitable for storing electronic instructions and coupled to a bus, respectively, The computer readable mediums including but not limited to any types of disks (including floppy disks, hard disks, optical disks, CD-ROMs, and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic card or light card. That is, a readable medium includes any medium that is stored or transmitted by an apparatus (for example, a computer) in a readable form.

Those skilled in the art will understand that each block of the block diagrams and/or block diagrams and/or flow diagrams and combinations of blocks in the block diagrams and/or block diagrams and/or flow diagrams can be implemented by computer program instructions. Those skilled in the art will understand that these computer program instructions can be implemented by a general purpose computer, a professional computer, or a processor of other programmable data processing methods, such that schemes specified in the block or various blocks of the disclosed structure and/or block diagrams and/or flow diagrams can be executed by a computer or the processor of other programmable data processing method.

Those skilled in the art will understand that the steps, measures, and schemes in the various operations, methods, and processes that have been discussed in the present disclosure can be alternated, changed, combined, or deleted. Further, other steps, measures, and schemes in the various operations, methods, and processes that have been discussed in the present disclosure can be alternated, modified, rearranged, decomposed, combined, or deleted. Further, the steps, measures, and solutions in the prior art having various operations, methods, and processes disclosed in the present disclosure can also be alternated, modified, rearranged, decomposed, combined, or deleted.

The above is only a part of the embodiments of the present disclosure, and it should be noted that those skilled in the art can also make several improvements and retouchings without departing from the principles of the present disclosure. These improvements and retouchings should be considered as within the scope of protection of the present disclosure.

While the present disclosure has been shown and described with reference to certain exemplary embodiments thereof, it should be understood by those skilled in the art that various changes in form and details may be made therein without departing from the principle and spirit of the present disclosure which are defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first user equipment (UE), the method comprising:
   receiving, from a base station (BS), configuration parameters for a sidelink open loop power control (OLPC) via a radio resource control (RRC) signaling, wherein the configuration parameters include a first alpha value and a first P0 value for the sidelink OLPC, and a second alpha value and a second P0 value for a downlink OLPC;
   receiving, from a second UE, information on a reference signal received power (RSRP); and
   acquiring a power of a physical sidelink shared channel (PSSCH) based on a maximum transmission power, and a minimum power between the power of the PSSCH for the downlink OLPC and the power of the PSSCH for the sidelink OLPC,
   wherein the power of the PSSCH for the sidelink OLPC is acquired based on the first alpha value for the sidelink OLPC, the first P0 value for the sidelink OLPC, and the information on RSRP,
   wherein the maximum transmission power is determined based on a priority of the PSSCH and a channel busy ratio (CBR), and
   wherein the RSRP is measured by the second UE based on a demodulation reference signal (DMRS) of the PSSCH.

2. A first user equipment (UE) comprising a controller, the controller is configured to:
   receive, from a base station (BS), configuration parameters for a sidelink open loop power control (OLPC) via a radio resource control (RRC) signaling, wherein the configuration parameters include a first alpha value and a first P0 value for the sidelink OLPC, and a second alpha value and a second P0 value for a downlink OLPC;
   receive, from a second UE, information on a reference signal received power (RSRP); and
   acquire a power of a physical sidelink shared channel (PSSCH) based on a maximum transmission power, and a minimum power between the power of the PSSCH for the downlink OLPC and the power of the PSSCH for the sidelink OLPC,
   wherein the power of the PSSCH for the sidelink OLPC is acquired based on the first alpha value for the sidelink OLPC, the first P0 value for the sidelink OLPC, and the information on RSRP,
   wherein the maximum transmission power is determined based on a priority of the PSSCH and a channel busy ratio (CBR), and
   wherein the RSRP is measured by the second UE based on a demodulation reference signal (DMRS) of the PSSCH.

3. The method of claim 1, wherein the first alpha value for the sidelink OLPC is a pathloss compensation factor for the sidelink OLPC, and
   wherein the first P0 value for the sidelink OLPC is a target receiving power for the sidelink OLPC.

4. The first UE of claim 2, wherein the first alpha value for the sidelink OLPC is a pathloss compensation factor for the sidelink OLPC, and
   wherein the first P0 value for the sidelink OLPC is a target receiving power for the sidelink OLPC.

5. The method of claim 3, wherein, when the first UE is in-coverage, the power of the PSSCH is determined based on the power of the PSSCH for the downlink OLPC before a sidelink path loss is estimated, and
   wherein, when the first UE is out-coverage, the power of the PSSCH is pre-configured before the sidelink path loss is estimated.

6. The first UE of claim 4, wherein, when the first UE is in-coverage, the power of the PSSCH is determined based on the power of the PSSCH for the downlink OLPC before a sidelink path loss is estimated, and
   wherein, when the first UE is out-coverage, the power of the PSSCH is pre-configured before the sidelink path loss is estimated.

7. The method of claim 1, further comprising:
   receiving, from the second UE, a signal for physical sidelink feedback channel (PSFCH),
   wherein the PSFCH is configured with first parameter configuration information, and
   wherein the PSSCH is configured with second parameter configuration information.

8. The first UE of claim 2, wherein the controller is further configured to:
- receive, from the second UE, a signal for physical sidelink feedback channel (PSFCH),
- wherein the PSFCH is configured with first parameter configuration information, and
- wherein the PSSCH is configured with second parameter configuration information.

* * * * *